(12) United States Patent
    Zhu

(10) Patent No.: US 12,299,461 B2
(45) Date of Patent: May 13, 2025

(54) USER INTERFACE LAYOUT METHOD AND ELECTRONIC DEVICE

(71) Applicant: HUAWEI TECHNOLOGIES CO., LTD., Guangdong (CN)

(72) Inventor: Pei Zhu, Wuhan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/554,047

(22) Filed: Dec. 17, 2021

(65) Prior Publication Data
    US 2022/0107821 A1    Apr. 7, 2022

Related U.S. Application Data

(63) Continuation of application No. PCT/CN2020/096703, filed on Jun. 18, 2020.

(30) Foreign Application Priority Data

Jun. 19, 2019    (CN) .......................... 201910541817.2

(51) Int. Cl.
    *G06F 3/048*     (2013.01)
    *G06F 3/0346*    (2013.01)
    *G06F 9/451*     (2018.01)
    *G06F 3/0488*    (2022.01)

(52) U.S. Cl.
    CPC ............ *G06F 9/451* (2018.02); *G06F 3/0346* (2013.01); *G06F 3/0488* (2013.01)

(58) Field of Classification Search
    CPC ...... G06F 9/451; G06F 3/0346; G06F 3/0488; G06F 3/016
    See application file for complete search history.

(56) References Cited

U.S. PATENT DOCUMENTS 8,373,615 B2    2/2013   Chen et al.
9,285,919 B2    3/2016   Chihara
                (Continued)

FOREIGN PATENT DOCUMENTS

CN    103809928 A    5/2014
CN    106020810 A    10/2016
              (Continued)

OTHER PUBLICATIONS

Office Action issued in Application No. IN202117060030, dated Jul. 7, 2022, 6 pages.
(Continued)

*Primary Examiner* — Aleksey Olshannikov

(57) ABSTRACT

A user interface layout method is provided and it includes: When a posture of an electronic device is a landscape posture, the electronic device lays out an interface element of a first user interface based on a second width and a second height, then reduces a size of the first user interface to a first width and a first height, and renders the reduced user interface to a display. In a landscape posture, a width and a height of a user interface are respectively a first width which is less than a width of the display and a first height which is equal to a height of the display. In a portrait posture, a width of the display is a second width. A ratio of a second height to the first height is equal to a ratio of the second width to the first width.

19 Claims, 27 Drawing Sheets

(56) References Cited

U.S. PATENT DOCUMENTS

| | | | |
|---|---|---|---|
| 2010/0079355 A1* | 4/2010 | Kilpatrick, II | G06F 1/1694 345/1.3 |
| 2013/0021377 A1* | 1/2013 | Doll | G09G 5/14 345/649 |
| 2013/0021379 A1 | 1/2013 | Sirpal et al. | |
| 2013/0227469 A1 | 8/2013 | Park | |
| 2014/0351721 A1* | 11/2014 | DeLuca | G06F 16/9577 715/760 |
| 2020/0301469 A1* | 9/2020 | Choi | G06F 3/147 |
| 2021/0342045 A1* | 11/2021 | Wang | G06F 1/1641 |

FOREIGN PATENT DOCUMENTS

| | | |
|---|---|---|
| CN | 106814989 A | 6/2017 |
| CN | 107613342 A | 1/2018 |
| CN | 109076125 A | 12/2018 |
| CN | 109710135 A | 5/2019 |
| EP | 3379397 A1 | 9/2018 |
| JP | 2013228972 A | 11/2013 |
| JP | 2013546050 A | 12/2013 |
| JP | 2014149860 A | 8/2014 |
| JP | 2019511029 A | 4/2019 |
| WO | 2010109849 A1 | 9/2010 |

OTHER PUBLICATIONS

Office Action issued in CN201910541817.2, dated Jul. 27, 2021, 8 pages.

International Search Report and Written Opinion issued in PCT/CN2020/096703, dated Aug. 27, 2020, 9 pages.

Office Action issued in JP2021-573594, dated Jan. 17, 2023 with English Translation 7 pages.

Office Action issued in JP2021-573594, dated Jul. 4, 2023 with English translation, 8 pages.

\* cited by examiner

USER INTERFACE LAYOUT METHOD AND ELECTRONIC DEVICE

CROSS-REFERENCE TO RELATED APPLICATIONS

This application is a continuation of International Application No. PCT/CN2020/096703, filed on Jun. 18, 2020, which claims priority to Chinese Patent Application No. 201910541817.2, filed on Jun. 19, 2019. The disclosures of the aforementioned applications are hereby incorporated by reference in their entireties.

TECHNICAL FIELD

This application relates to the field of electronic technologies, and in particular, to a user interface layout method and an electronic device.

BACKGROUND

Currently, on electronic devices such as a smartphone and a tablet device, some applications such as a video play application and a game application may support switching a user interface between landscape and portrait. In this way, user interfaces of these applications can be adaptively switched between landscape and portrait as a user changes a posture of the electronic device. In addition, when a foldable device is switched between a single-screen display state and a large-screen display state, a size of a display used for displaying changes, and user interfaces of these applications can also adapt to the size change of the display for displaying.

However, user interfaces of other applications neither support switching between landscape and portrait, nor adapt to the size change of the display on the foldable device for displaying. These applications are, for example, a social application "WeChat" and a shopping application "Taobao". These applications cannot provide a user interface capable of switching between landscape and portrait for the user, and cannot adapt to the change of the size of the display to display a user interface when the size of the display on the foldable device changes, thereby reducing convenience of use.

To resolve the foregoing problem, in the conventional technology, when starting an application, the electronic device may obtain a size such as a width and a height of the display. When a user interface of the application needs to be switched between landscape and portrait, or when a size of a display area on the display of the foldable device changes, the size of the display changes. The electronic device may determine a size of the user interface based on the size of the display obtained when the electronic device starts the application, and lay out an interface element of the user interface on the display, of which the size changes.

However, when the user interface is switched between landscape and portrait, or the size of the display area on the display of the foldable device changes, the size of the display changes. However, the electronic device still lays out the interface element of the user interface based on the size of the display obtained when the electronic device starts the application. In this way, a blank area appears in the user interface viewed by the user or some interface elements are not displayed, thereby reducing the convenience of switching between landscape and portrait.

SUMMARY

Embodiments of this application provide a user interface layout method. A user interface that is laid out according to the method can reduce layout disorder during switching between landscape and portrait, to improve convenience of use.

According to a first aspect, a user interface layout method for an electronic device is provided. The method may include: The electronic device receives a first instruction used to start a first application. The electronic device detects a posture of the electronic device, where the postures of the electronic device includes a landscape posture and a portrait posture. When the posture of the electronic device is the landscape posture, the electronic device displays a first user interface of the first application, where a width of the display is a third width, and a height of the display is a third height. When the posture of the electronic device is the portrait posture, the electronic device displays a second user interface of the first application, where a width of the display is equal to the third height, and a height of the display is equal to the third width. A width of the first user interface is a first width, a height of the first user interface is a first height, the first user interface is obtained by reducing a third user interface, the first width is less than the third width, and the first height is equal to the third height. A width of the third user interface is equal to the third height, a height of the third user interface is a second height, and a ratio of the second height to the first height is equal to a ratio of the third height to the first width. In this way, when the electronic device is switched from a first posture to a second posture, an interface element of the user interface is laid out based on a width of the display in the second posture of the electronic device. Therefore, the first user interface drawn by the electronic device can reduce layout disorder that occur in the user interface during switching between landscape and portrait, to improve convenience of use.

With reference to the first aspect, in a possible implementation, the method further includes: The electronic device receives a touch operation performed by a user on the first user interface. The electronic device obtains coordinates of a second coordinate point that is in a mapping relationship with a first coordinate point corresponding to the touch operation, where the second coordinate point is a coordinate point obtained after the first user interface is enlarged to the third user interface, and the first coordinate point is a coordinate point in the first user interface. The electronic device responds to the touch operation based on an interface element corresponding to the second coordinate point. In this way, the electronic device can implement correspondence between a touch point of a displayed interface element and coordinates to which the displayed interface element should actually correspond, to improve accuracy of responding to a user operation on the displayed interface element.

With reference to the first aspect, in a possible implementation, the electronic device enlarges the first user interface to the third user interface; the electronic device draws, in the third user interface, an interface element of the first user interface that is laid out based on the third user interface; and the electronic device reduces the third user interface in which drawing is completed to the first user interface and renders the reduced third user interface to the display. In this way, when the posture of the electronic device changes, less disorder can occur in a displayed user interface.

With reference to the first aspect, in a possible implementation, the electronic device draws, in the second user interface, an interface element of the second user interface, where the interface element of the second user interface is laid out based on a width of the second user interface that is the third height and a height of the second user interface that is the third width, and the electronic device renders the second user interface in which drawing is completed to the display. In this way, a user interface obtained after laying out can adaptively fill the display.

With reference to the first aspect, in a possible implementation, after the electronic device displays the first user interface of the first application, the method further includes: When detecting that the posture of the electronic device is switched from the landscape posture to the portrait posture, the electronic device switches a user interface displayed by the electronic device from the first user interface to the second user interface.

With reference to the first aspect, in a possible implementation, after the electronic device displays the second user interface of the first application, the method further includes: When detecting that the posture of the electronic device is switched from the portrait posture to the landscape posture, the electronic device switches a user interface displayed by the electronic device from the second user interface to the first user interface.

According to a second aspect, a user interface layout method is provided. The method may include: An electronic device receives a first instruction used to start a first application. The electronic device detects a posture of the electronic device, where the posture of the electronic device includes a single-screen posture and a large-screen posture. When the posture of the electronic device is the single-screen posture, the electronic device displays a first user interface of the first application, where a width of the display is a first width, and a height of the display is a first height. When the posture of the electronic device is the large-screen posture, the electronic device displays a second user interface of the first application, where a width of the display is a second width, the second width is greater than the first width, and a height of the display is a first height. A width of the first user interface is equal to the first width, a height of the first user interface is equal to the first height, and the first user interface is obtained by reducing a third user interface. A width of the third user interface is equal to the second width, a height of the third user interface is a second height, and a ratio of the second height to the first height is equal to a ratio of the second width to the first width. In this way, when the electronic device is switched from a first posture to a second posture, an interface element of the user interface is laid out based on a width of the display in the second posture of the electronic device. Therefore, the first user interface drawn by the electronic device can reduce layout disorder that occur in the user interface during switching between landscape and portrait, to improve convenience of use.

With reference to the second aspect, in a possible implementation, after the electronic device displays the first user interface of the first application, the method further includes: The electronic device receives a touch operation performed by a user on the first user interface. The electronic device obtains coordinates of a second coordinate point that is in a mapping relationship with a first coordinate point corresponding to the touch operation, where the second coordinate point is a coordinate point obtained after the first user interface is enlarged to the third user interface, and the first coordinate point is a coordinate point in the first user interface. The electronic device responds to the touch operation based on an interface element corresponding to the second coordinate point. In this way, the electronic device can implement correspondence between a touch point of a displayed interface element and coordinates to which the displayed interface element should actually correspond, to improve accuracy of responding to a user operation on the displayed interface element.

With reference to the second aspect, in a possible implementation, that the electronic device displays a first user interface of the first application includes: The electronic device enlarges the first user interface to the third user interface. The electronic device draws, in the third user interface, an interface element of the first user interface that is laid out based on the third user interface.

The electronic device reduces the third user interface in which drawing is completed to the first user interface and renders the reduced third user interface to the display. In this way, when the posture of the electronic device changes, less disorder can occur in a displayed user interface.

With reference to the second aspect, in a possible implementation, that the electronic device displays a second user interface of the first application includes: The electronic device draws, in the second user interface, an interface element of the second user interface, where the interface element of the second user interface is laid out based on a width of the second user interface that is the second width and a height of the second user interface that is the first height, and the electronic device renders the second user interface in which drawing is completed to the display. In this way, a user interface obtained after laying out can adaptively fill the display.

With reference to the second aspect, in a possible implementation, after the electronic device displays the first user interface of the first application, the method further includes: When detecting that the posture of the electronic device is switched from the single-screen posture to the large-screen posture, the electronic device switches a user interface displayed by the electronic device from the first user interface to the second user interface.

With reference to the second aspect, in a possible implementation, after the electronic device displays the second user interface of the first application, the method further includes: When detecting that a posture of the electronic device is switched from the large-screen posture to the single-screen posture, the electronic device switches a user interface displayed by the electronic device from the second user interface to the first user interface.

According to a third aspect, an electronic device is provided, including a communications interface, a memory, and a processor. The communications interface and the memory are coupled to the processor, the memory is configured to store computer program code, and the computer program code includes computer instructions. When the processor reads the computer instructions from the memory, the electronic device is enabled to perform any possible implementation of the first aspect or any possible implementation of the second aspect.

According to a fourth aspect, a computer-readable storage medium including instructions is provided. When the instructions are run on an electronic device, the electronic device is enabled to perform any possible implementation of the first aspect or any possible implementation of the second aspect.

According to a fifth aspect, a computer product is provided. When the computer program product is run on a computer, the computer is enabled to perform any possible implementation of the first aspect or any possible implementation of the second aspect.

BRIEF DESCRIPTION OF DRAWINGS

To describe technical solutions in the embodiments of this application more clearly, the following describes the accompanying drawings required for the embodiments in this application.

DESCRIPTION OF EMBODIMENTS

Figure 1:
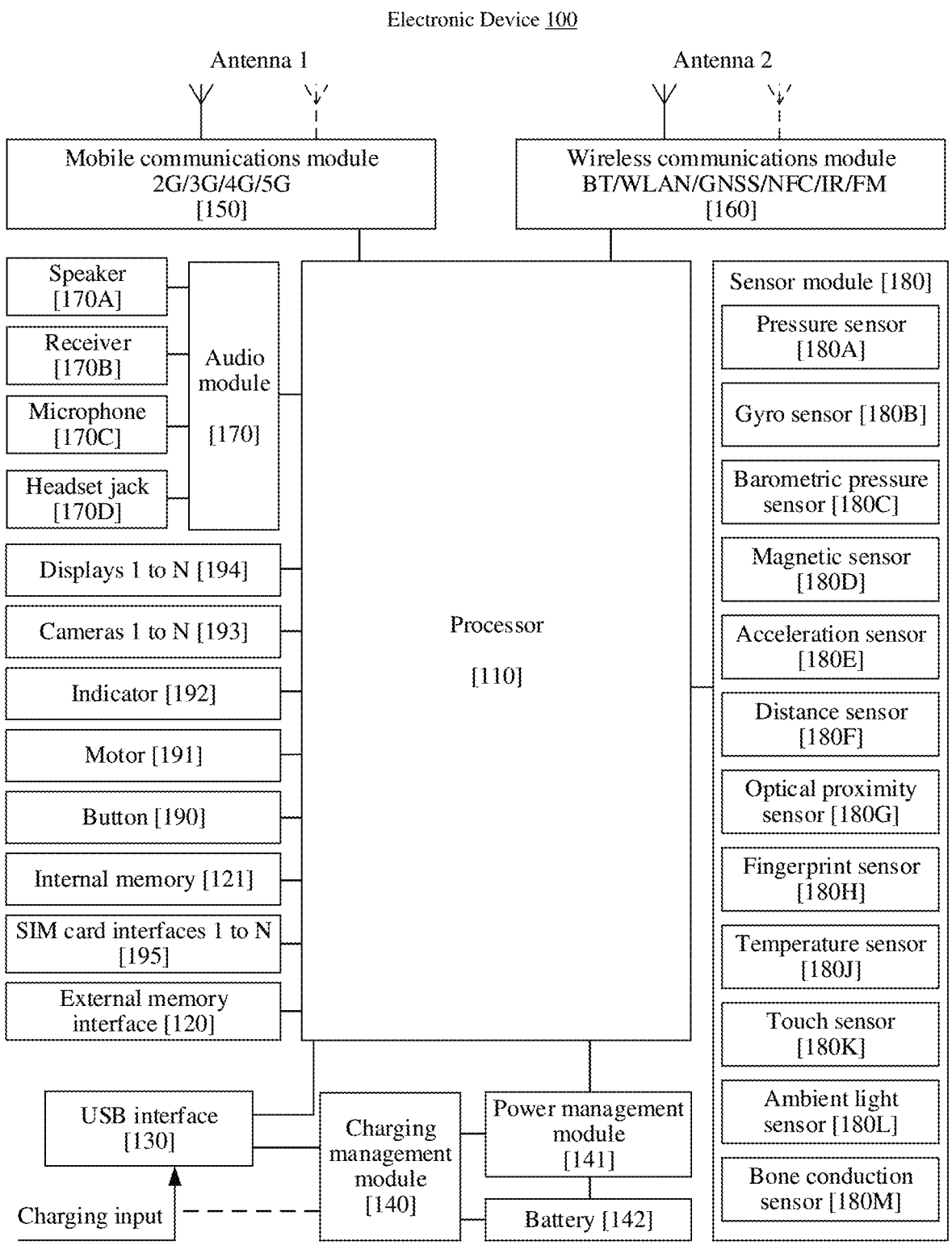
FIG. 1 is a schematic diagram of a structure of an electronic device according to an embodiment of this application.

The terms used in the following embodiments of this application are merely intended to describe specific embodiments, but are not intended to limit this application. The terms "one", "a", "the", "the foregoing", "this", and "the one" of singular forms used in this specification and the appended claims of this application are also intended to include plural forms, unless otherwise specified in the context clearly. It should be further understood that the term "and/or" used in this application indicates and includes any or all possible combinations of one or more listed items.

The following describes an electronic device, a user interface used for such an electronic device, and embodiments used to use such an electronic device. In some embodiments, the electronic device may be a portable electronic device that further includes other functions such as a personal digital assistant function and/or a music player function, for example, a mobile phone, a tablet computer, or a wearable electronic device having a wireless communication function (for example, a smartwatch). An example embodiment of the portable electronic device includes but is not limited to a portable electronic device using iOS®, Android®, Microsoft®, or another operating system. The portable electronic device may alternatively be another portable electronic device, for example, a laptop with a touch-sensitive surface or a touch panel. It should be further understood that, in some other embodiments, the electronic device may not be a portable electronic device, but a desktop computer having a touch-sensitive surface or a touch panel.

The term "user interface (UI)" in the specification, claims, and accompanying drawings of this application is a medium interface for interaction and information exchange between a user and an application or an operating system, and a user interface implements conversion between an internal form of information and a form that can be accepted by the user. A user interface of an application is source code written in a specific computer language such as Java or an extensible markup language (XML). The interface source code is parsed and rendered on a terminal device, and is finally presented as content that can be identified by the user, for example, a control such as a picture, a text, or a button. The control is also referred to as a widget, and is a basic element of the user interface. Typical controls include a toolbar, a menu bar, a text box, a button, a scrollbar, an image, and a text. An attribute and content of a control in an interface are defined by using a tag or a node. For example, the XML defines, by using a node such as <Textview>, <ImgView>, or <VideoView>, the control included in the interface. One node corresponds to one control or attribute in the interface. After being parsed and rendered, the node is presented as content visible to a user. In addition, interfaces of a plurality of applications such as a hybrid application usually further include a web page. The web page, also referred to as a page, may be understood as a special control embedded in an application interface. The web page is source code written in a specific computer language, for example, a hypertext markup language (HTML), cascading style sheets (CSS), or JavaScript (JS). A browser or a web page display component whose function is similar to that of a browser may load and display the web page source code as content that can be identified by the user. Specific content included in the web page is also defined by using a tag or a node in the web page source code. For example, the GTML defines an element and an attribute of the web page by using <p>, <img>, <video>, or <canvas>.

The user interface is usually in a representation form of a graphical user interface (GUI), which is a user interface that is related to a computer operation and that is displayed in a graphical manner. The user interface may be an interface element such as an icon, a window, or a control displayed on a display of an electronic device. The control may include a visible interface element such as an icon, a button, a menu, a tab, a text box, a dialog box, a status bar, a navigation bar, or a widget.

FIG. 1 is a schematic diagram of a structure of an electronic device 100 according to an embodiment of the present disclosure.

The following uses the electronic device 100 as an example to specifically describe the embodiments. It should be understood that the electronic device 100 may have more or fewer components than those shown in the figure, or two or more components may be combined, or different component configurations may be used. Various components shown in the figure may be implemented in hardware, software, or a combination of hardware and software that includes one or more signal processing and/or application-specific integrated circuits.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 100. The controller may generate an operation control signal based on an instruction operation code and a time sequence signal, to control to read instructions and execute instructions.

A memory may be further disposed in the processor 110, and is configured to store instructions and data. In some embodiments, the memory in the processor 110 is a cache memory. The memory may store instructions or data that has just been used or is cyclically used by the processor 110. If the processor 110 needs to use the instructions or the data again, the processor 110 may directly invoke the instructions or the data from the memory, to avoid repeated access. This reduces a waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDL) and one serial clock line (SCL). In some embodiments, the processor 110 may include a plurality of groups of I2C buses. The processor 110 may be separately coupled to the touch sensor 180K, a charger, a flash light, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement the function of answering a call by using the Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using the Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, and the like. The GPIO interface may be further configured as the I2C interface, the I2S interface, the UART interface, the MIPI interface, or the like.

The USB interface 130 is an interface that complies with a USB standard specification, and may be specifically a mini USB interface, a micro USB interface, a USB Type-C interface, or the like. The USB interface 130 may be configured to connect to a charger to charge the electronic device 100, or may be configured to transmit data between the electronic device 100 and a peripheral device, or may be configured to connect to a headset to play audio by using the headset. Alternatively, the interface may be configured to connect to another electronic device such as an AR device.

It may be understood that an interface connection relationship between the modules that is shown in this embodiment of the present invention is merely an example for description, and does not constitute a limitation on the structure of the electronic device 100. In other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments in which wired charging is used, the charging management module 140 may receive a charging input from the wired charger through the USB interface 130. In some embodiments in which wireless charging is used, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect the battery 142 and the charging management module 140 to the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a quantity of battery cycles, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 each are configured to transmit and receive electromagnetic wave signals. Each antenna in the electronic device 100 may be configured to cover one or more communication frequency bands. Different antennas may be further multiplexed, to increase antenna utilization. For example, the antenna 1 may be multiplexed as a diversity antenna in a wireless local area network. In some other embodiments, the antenna may be used in combination with a tuning switch.

The mobile communications module 150 may provide a solution, applied to the electronic device 100, to wireless communication including 2G, 3G, 4G, 5G, or the like. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transfer a processed electromagnetic wave to the modem processor for demodulation. The mobile communications module 150 may further amplify a signal modulated by the modem processor, and convert the signal to an electromagnetic wave for radiation through the antenna 1. In some embodiments, at least some functional modules of the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through the demodulation to the baseband processor for processing. The low-frequency baseband signal is processed by the baseband processor, and then transmitted to the application processor. The application processor outputs a sound signal by using an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another function module.

The wireless communications module 160 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the electronic device 100. The wireless communications module 160 may be one or more components integrated into at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-CDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or satellite based augmentation systems (SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and perform graphics rendering. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, quantum dot light emitting diodes (QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens. The photosensitive element of the camera converts an optical signal into an electrical signal, and transmits the electrical signal to the ISP for processing. The ISP converts the electrical signal into an image that is perceptible to the eye. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP. The ISP converts the electrical signal into a digital image signal, and outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more video codecs. Therefore, the electronic device 100 may play or record videos in a plurality of coding formats, for example, moving picture experts group (MPEG)-1, MPEG-2, MPEG-3, and MPEG-4.

The NPU is a neural-network (NN) computing processor. The NPU quickly processes input information by referring to a biological neural network structure, for example, by referring to a mode of transfer between human brain neurons, and may further continuously perform self-learning. The electronic device 100 may implement intelligent cognition such as image recognition, facial recognition, speech recognition, and text understanding through the NPU.

The external memory interface 120 may be configured to connect to an external memory card such as a micro SD card, to extend a storage capability of the electronic device 100. The external storage card communicates with the processor 110 through the external memory interface 120, to implement a data storage function, for example, to store files such as music and a video in the external memory card.

The internal memory 121 may be configured to store computer-executable program code. The executable program code includes instructions. The processor 110 runs the instructions stored in the internal memory 121, to implement various function applications and data processing of the electronic device 100. The internal memory 121 may include a program storage area and a data storage area. The program storage area may store an operating system, an application required by at least one function (for example, a sound playing function or an image playing function), and the like. The data storage area may store data (for example, audio data, a phone book, and the like) created in a process of using the electronic device 100, and the like. In addition, the internal memory 121 may include a high-speed random access memory, or may include a nonvolatile memory, for example, at least one magnetic disk storage device, a flash memory device, or a universal flash storage (UFS).

The electronic device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device 100 may listen to music or answer a hands-free call by using the speaker 170A.

The receiver 170B, also referred to as an "earpiece", is configured to convert an audio electrical signal into a sound signal. When the electronic device 100 answers a call or receives voice information, the receiver 170B may be placed near a human ear to listen to a voice.

The microphone 170C, also referred to as a "mike" or a "microphone", is configured to convert a sound signal into an electrical signal. When making a call or sending a voice message, a user may make a sound near the microphone 170C, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like. The headset jack 170D is configured to connect to a wired headset. The headset jack 170D may be the USB interface 130 or a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, for example, a resistive pressure sensor, an inductive pressure sensor, a capacitive pressure sensor. The capacitive pressure sensor may include at least two parallel plates made of conductive materials. Capacitance between electrodes changes when force is applied to the pressure sensor 180A. The electronic device 100 determines pressure intensity based on a change of the capacitance. When a touch operation is performed on the display 194, the electronic device 100 detects a strength of the touch operation based on the pressure sensor 180A. The electronic device 100 may also calculate a touch location based on a detection signal of the pressure sensor 180A. In some embodiments, touch operations that are applied to a same touch position but have different touch operation strength may correspond to different operation instructions. For example, when a touch operation whose touch operation intensity is less than a first pressure threshold is performed on an icon of Messages, an instruction for viewing an SMS message is executed. When a touch operation whose touch operation intensity is greater than or equal to the first pressure threshold is performed on an icon of Messages, an instruction for creating an SMS message is executed.

The gyro sensor 180B may be configured to determine a motion posture of the electronic device 100. In some embodiments, an angular velocity of the electronic device 100 around three axes (namely, axes X, Y, and Z) may be determined by using the gyro sensor 180B. The gyro sensor 180B may be used for image stabilization during photographing. For example, when the shutter is pressed, the gyro sensor 180B detects an angle at which the electronic device 100 jitters, and calculates, based on the angle, a distance for which a lens module needs to compensate, and allows the lens to eliminate the jitter of the electronic device 100 through a reverse motion, to implement image stabilization. The gyro sensor 180B may be further used in a navigation scenario and a somatic game scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover by using the magnetic sensor 180D, to set a feature such as automatic unlocking through flipping based on a detected opening or closing state of the flip cover.

The acceleration sensor 180E may detect accelerations in various directions (usually on three axes) of the electronic device 100, and may detect magnitude and a direction of gravity when the electronic device 100 is still. The acceleration sensor 180E may be further configured to identify a posture of the electronic device, and is applied to an application such as a pedometer and switching between landscape and portrait. In this application, the electronic device 100 may perform switching between landscape and portrait and switching between single-screen display and large-screen display of a foldable screen based on a change of an acceleration value and a gravity value detected by the acceleration sensor 180E.

The distance sensor 180F is configured to measure a distance. The electronic device 100 may measure a distance in an infrared or a laser manner. In some embodiments, in a photographing scenario, the electronic device 100 may measure a distance by using the distance sensor 180F to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light emitting diode. The electronic device 100 detects infrared reflected light from a nearby object by using the photodiode. When detecting sufficient reflected light, the electronic device 100 may determine that there is an object near the electronic device 100. When detecting insufficient reflected light, the electronic device 100 may determine that there is no object near the electronic device 100. The electronic device 100 may detect, by using the optical proximity sensor 180G, that the user holds the electronic device 100 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light luminance. The electronic device 100 may adaptively adjust brightness of the display 194 based on the sensed ambient light brightness. The ambient light sensor 180L may be further configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 degrades performance of a processor near the temperature sensor 180J, to reduce power consumption for thermal protection. In some other embodiments, when the temperature is lower than another threshold, the electronic device 100 heats up the battery 142, to avoid abnormal shutdown of the electronic device 100 caused by a low temperature. In some other embodiments, when the temperature is less than still another threshold, the electronic device 100 boosts an output voltage of the battery 142, to prevent abnormal power-off caused by a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation on or near the touch sensor 180K. The touch sensor may transfer the detected touch operation to the application processor, to determine a type of a touch event. The display 194 may provide a visual output related to the touch operation. In some other embodiments, the touch sensor 180K may also be disposed on a surface of the electronic device 100 in a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may also be disposed in the headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder scenario, an information receiving scenario, an alarm clock scenario, and a game scenario) may also correspond to different vibration feedback effects. A touch vibration feedback effect may alternatively be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with the external storage card. The electronic device 100 interacts with a network by using the SIM card, to implement functions such as calling and data communication. In some embodiments, the electronic device 100 uses an eSIM, namely, an embedded SIM card. The eSIM card may be embedded into the electronic device 100, and cannot be separated from the electronic device 100.

Figure 2:
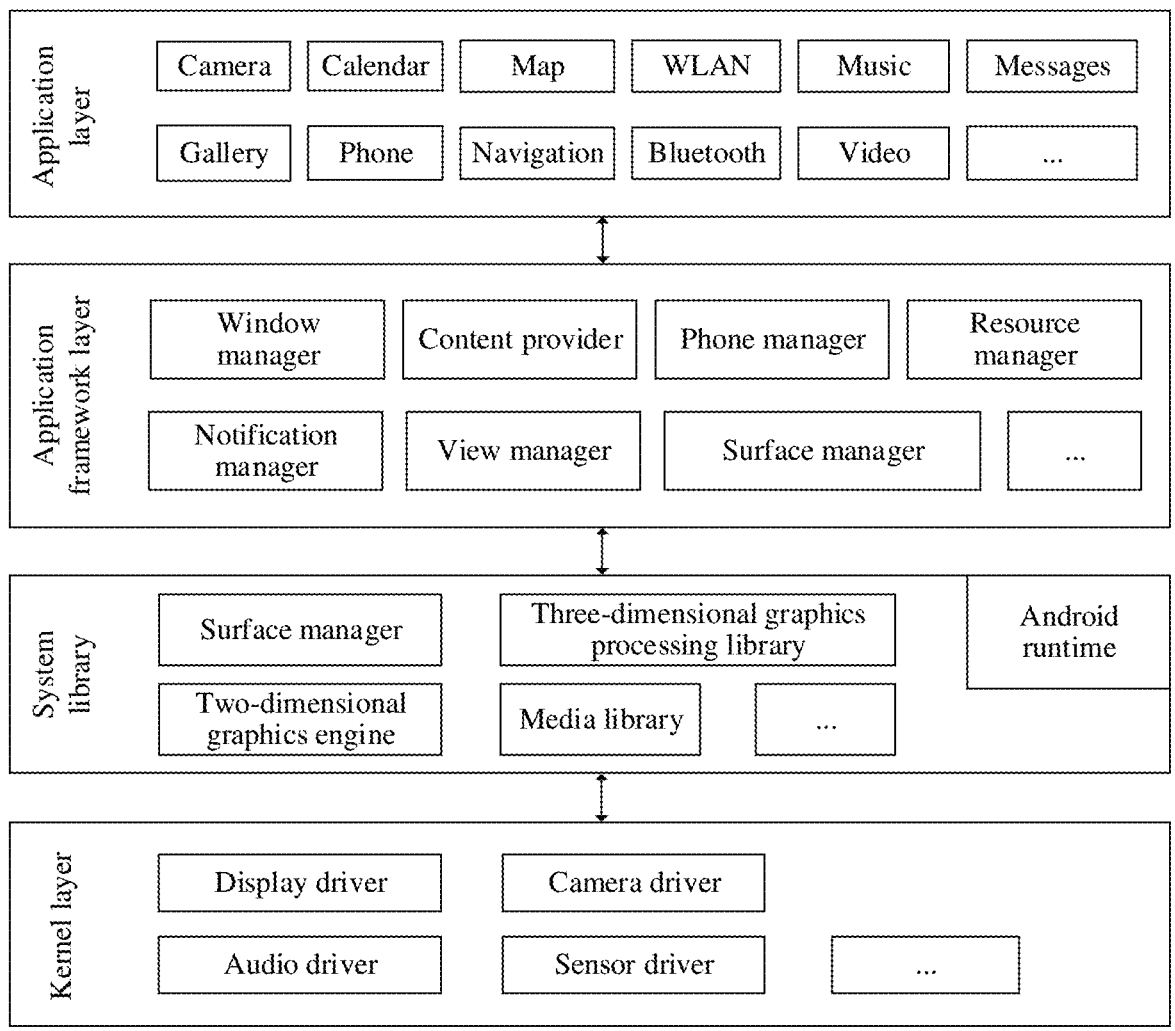
FIG. 2 is a block diagram of a software structure of an electronic device according to an embodiment of this application.

FIG. 2 is a block diagram of a software structure of the electronic device 100 according to an embodiment of the present invention.

In a layered architecture, software is divided into several layers, and each layer has a clear role and task. The layers communicate with each other through a software interface. In some embodiments, the Android system is divided into four layers: an application layer, an application framework layer, an Android runtime and a system library, and a kernel layer from top to bottom.

The application layer may include a series of application packages.

As shown in FIG. 2, the application packages may include applications (or referred to as applications) such as Camera, Gallery, Calendar, Phone, Map, Navigation, WLAN, Bluetooth, Music, Video, and Messages.

The application framework layer provides an application programming interface (API) and a programming framework for an application at the application layer. The application framework layer includes some predefined functions.

As shown in FIG. 2, the application program framework layer may include a window manager, a content provider, a view system, a phone manager, a resource manager, a notification manager, a view manager, a surface manager, and the like. For specific descriptions of the view manager and the surface manager, refer to the specific descriptions in FIG. 12.

The window manager is configured to manage a window program. The window manager may obtain a size of a display, determine whether there is a status bar, perform screen locking, take a screenshot, and the like.

The view manager is configured to lay out and draw an obtained XML file of an application into an interface element of a user interface.

The surface manager is used to draw the interface element in a to-be-displayed user interface.

The content provider is configured to store and obtain data, and enable the data to be accessed by an application. The data may include a video, an image, audio, calls that are made and received, a browsing history and a bookmark, an address book, and the like.

The view system includes visual controls such as a control for displaying a text and a control for displaying a picture. The view system may be configured to construct an application. A display interface may include one or more views. For example, a display interface including a Messages notification icon may include a text display view and a picture display view.

The phone manager is configured to provide a communication function of the electronic device 100, for example, management of a call status (including answering, declining, or the like).

The resource manager provides various resources for an application, such as a localized character string, an icon, an image, a layout file, and a video file.

The notification manager enables an application to display notification information in a status bar, and may be configured to convey a notification type message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application program running on a background or a notification that appears on the interface in a form of a dialog interface. For example, text information is prompted in the status bar, a prompt tone is produced, the electronic device vibrates, or an indicator blinks.

The Android runtime includes a kernel library and a virtual machine. The Android runtime is responsible for scheduling and management of the Android system.

The core library includes two parts: a function that needs to be invoked in Java language and a core library of Android.

The application layer and the application framework layer run on the virtual machine. The virtual machine executes Java files of the application layer and the application framework layer as binary files. The virtual machine is configured to perform functions such as object lifecycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playing and recording of audio and video in a plurality of commonly used formats, static image files, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working process of software and hardware of the electronic device 100 with reference to a scenario in which an application (for example, Taobao) is started and a user interface of the application is then displayed.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a tap operation, and a control corresponding to the tap operation is a control of an icon of the Taobao application. The Taobao application invokes an interface of the application framework layer to start the Taobao application. The application framework layer measures, arranges, and draws a view of a home page of the Taobao application, and sends the view to the kernel layer for rendering. The display driver at the kernel layer renders the home page of the Taobao application to the display 194.

The following first describes a user interface layout of an application and how the electronic device displays a user interface of the application.

1. User Interface Layout of an Application:

An application may have one or more user interfaces. A user interface may include one or more interface elements, for example, controls such as a button and an icon. A user interface layout may be a width, a height, or the like of a user interface, and a size, a position, and the like of each interface element in the user interface. A source code file of the application may include a file that defines the user interface layout, such as an XML file in Android. To adapt to electronic devices having displays in different sizes, the user interface layout of the application may be adaptive when the application is developed. Specifically, the width of the user interface may be determined based on a width of a display, and the height of the user interface may be determined based on a height of the display. For example, the width of the user interface may be the same as the width of the display, and the height of the user interface may be the same as the height of the display, so that the user interface can fill the entire display.

The following describes the following concepts with reference to accompanying drawings: a width and a height of a user interface, and a width and a height of the display.

Figure 3A:
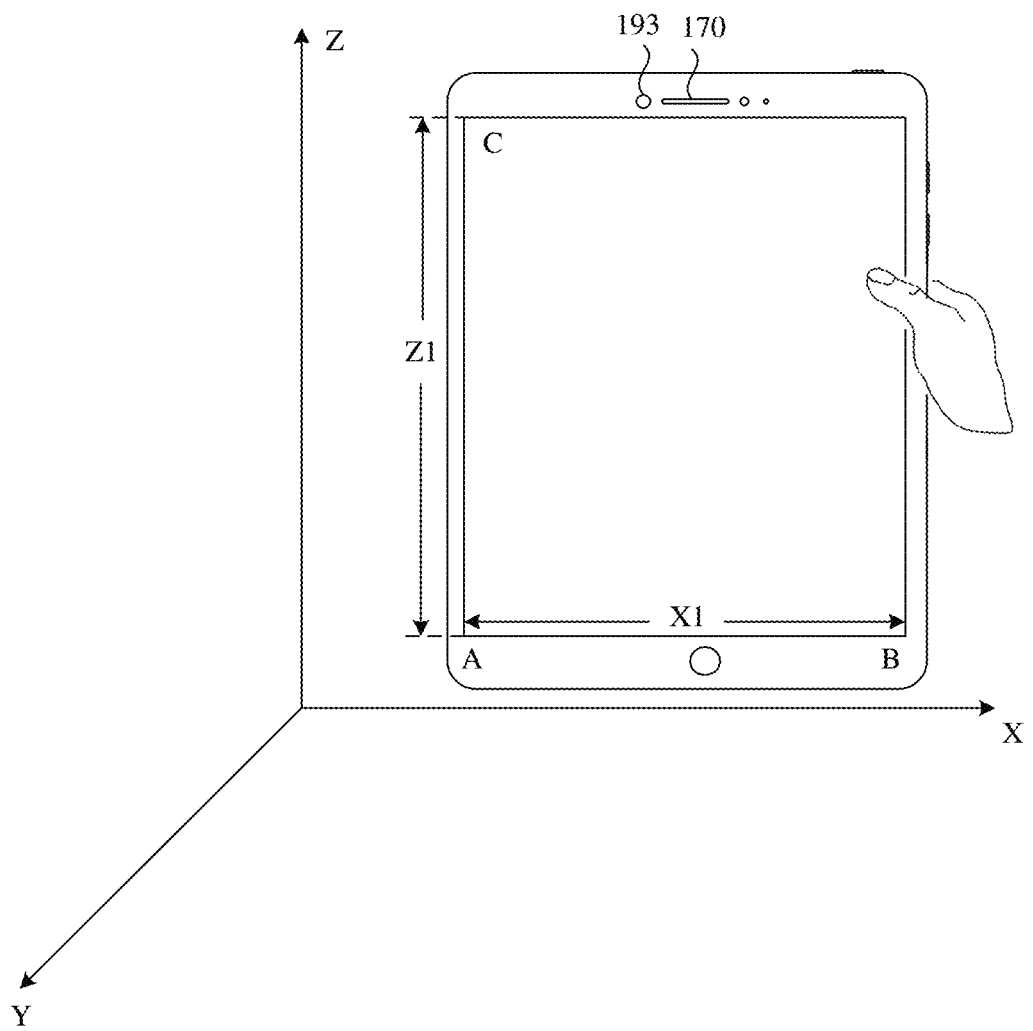
FIG. 3A and FIG. 3B are schematic diagrams of an electronic device according to an embodiment of this application.
Figure 3B:
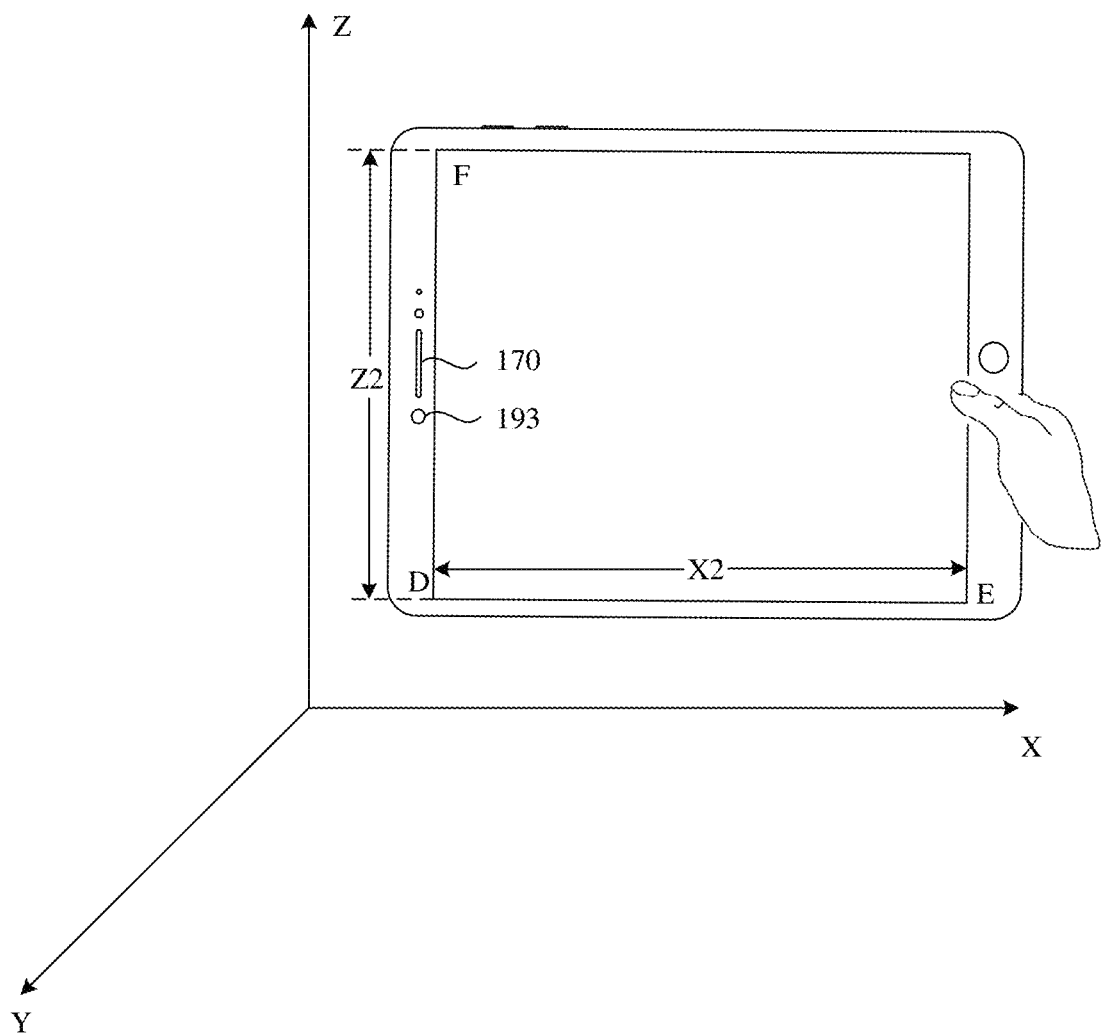

In this application, when a user holds an electronic device, a length of a side that is of a display and whose first included angle with the XOY plane in the spatial coordinate system XYZ is less than a first threshold is a width of the display. In this application, the side is referred to as a width side of the display. A side that is of the display and that is perpendicular to the width side is referred to as a height side of the display, and a length of the height side of the display is a height of the display. The XOY plane in the spatial coordinate system XYZ is parallel to the ground. The electronic device may obtain the first included angle by using a gyro sensor. The first threshold is configured by a system of the electronic device. The first threshold may be 10°, 20°, 30°, or the like. This is not limited in example embodiments of the present disclosure. FIG. 3A and FIG. 3B show schematic diagrams of the electronic device. In FIG. 3A, a side AB is a width side of the display, and a length X1 corresponding to the width side is a width of the display. A side AC is a height side of the display, and a length Z1 corresponding to the height side is a height of the display. In FIG. 3B, a side DE is a width side of the display, and a length X2 corresponding to the width side is a width of the display. A side DF is a height side of the display, and a length Z2 corresponding to the height side is a height of the display. Units of the height and the width may be units of length, such as centimeters, decimeters, and meters. The units of height and width may alternatively be pixels.

Figure 4A:
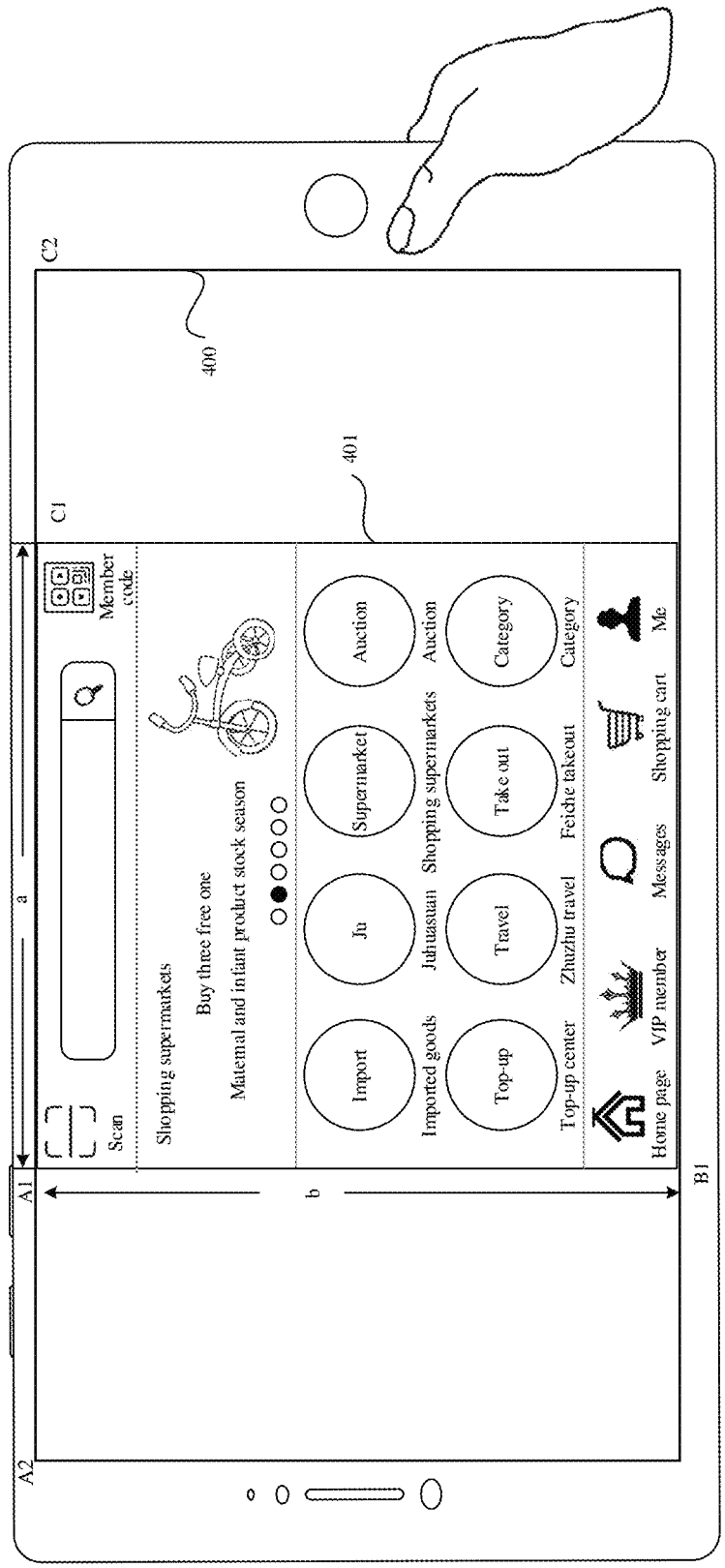
FIG. 4A and FIG. 4B are schematic diagrams of user interfaces in the conventional technology.
Figure 4B:
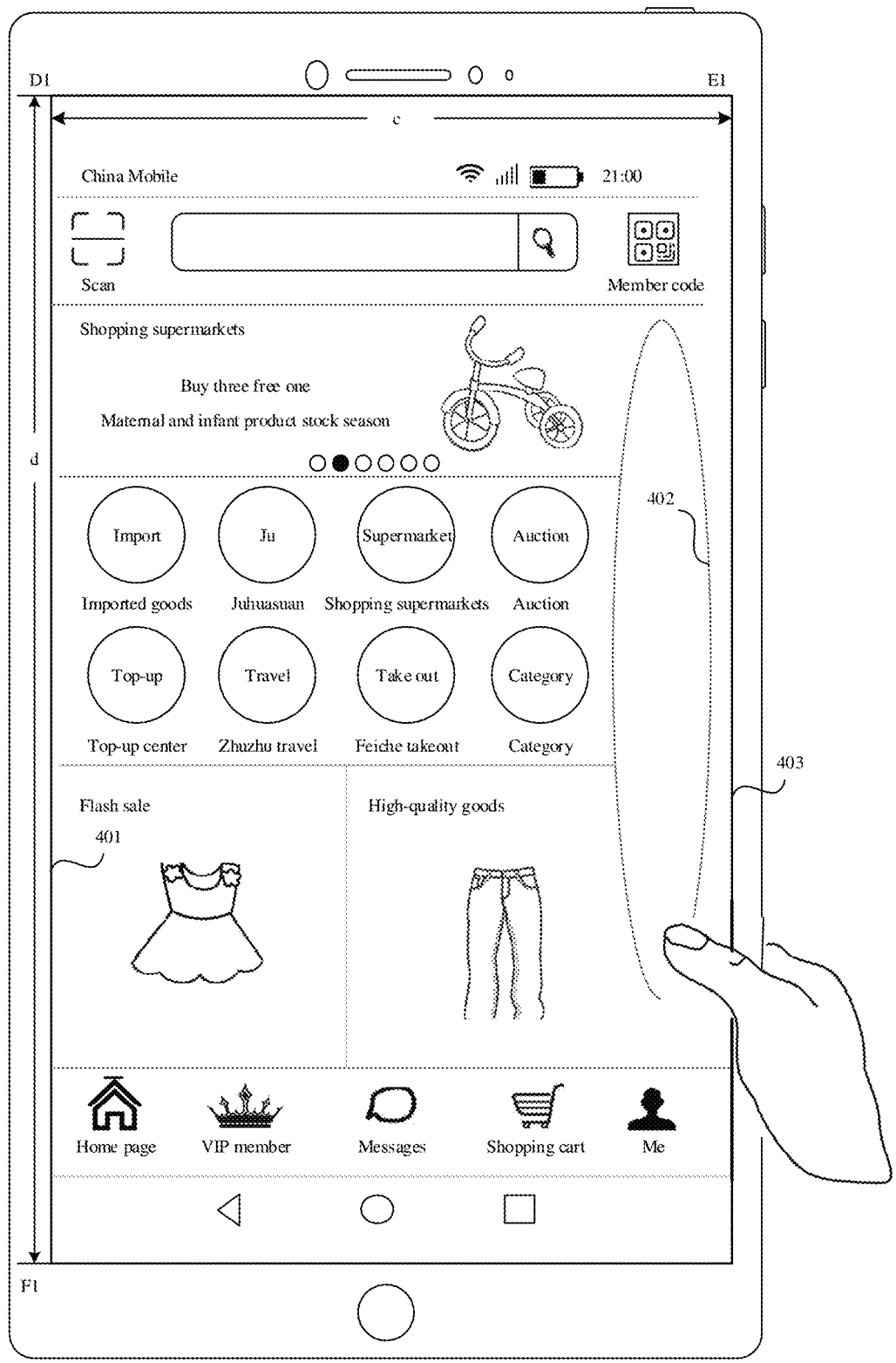

In this application, a side that is of a user interface and that is parallel to a width side of the display is referred to as a width side of the user interface. A length of the width side of the user interface is a width of the user interface. A side that is of the user interface and that is parallel to a height side of the display is referred to as a height side of the user interface. A length of the height side of the user interface is a height of the user interface. FIG. 4A and FIG. 4B are schematic diagrams of user interfaces displayed by the electronic device. In FIG. 4A, a side A1C1 is a width side of a user interface 401, and a length a of the side A1C1 is a width of the user interface 401. A side A1B1 is a height side of the user interface 401, and a length b of the side A1B1 is a height of the user interface 401, where a and b are real numbers greater than 0. In FIG. 4B, a width of a user interface 401 is the same as a width of a display 400, and a height of the user interface 401 is the same as a height of the display 400. A side D1E1 is a width side of the user interface 401, and a length c of the side D1E1 is the width of the user interface 401. The side D1F1 is a height side of the user interface 401, and a length d of the side D1F1 is the height of the user interface 401, where c and d are real numbers greater than 0.

2. How the Electronic Device Displays a User Interface of an Application:

When the electronic device starts an application, the electronic device may first obtain a size such as a width and a height of the display, and determine a width and a height of a to-be-displayed user interface based on the size such as the width and the height of the display. Then, the electronic device may determine a size, a position, and the like of each interface element in the user interface. So far, a layout of the to-be-displayed user interface is determined. Finally, the electronic device may render the to-be-displayed user interface, to display the to-be-displayed user interface on the display.

The following describes the following concepts with reference to the accompanying drawings: displaying in a landscape posture, displaying in a portrait posture, switching between landscape and portrait, a portrait posture, a landscape posture, a single-screen posture, a large-screen posture, displaying in a single-screen posture, displaying in a large-screen posture, supporting switching between landscape and portrait, not supporting switching between landscape and portrait, and supporting a function of switching between landscape and portrait, and not supporting a function of switching between landscape and portrait.

As shown in FIG. 4A, the displaying in a landscape posture is a display state in which the user interface 401 is displayed when a long side A2C2 of the display 400 is parallel to the width side A1C1 of the user interface 401.

As shown in FIG. 4B, the displaying in a portrait posture is a display state in which the user interface 401 is displayed when a short side of the display 400 is parallel to (including coinciding with) the width side D1E1 of the user interface 401.

Figure 5A:
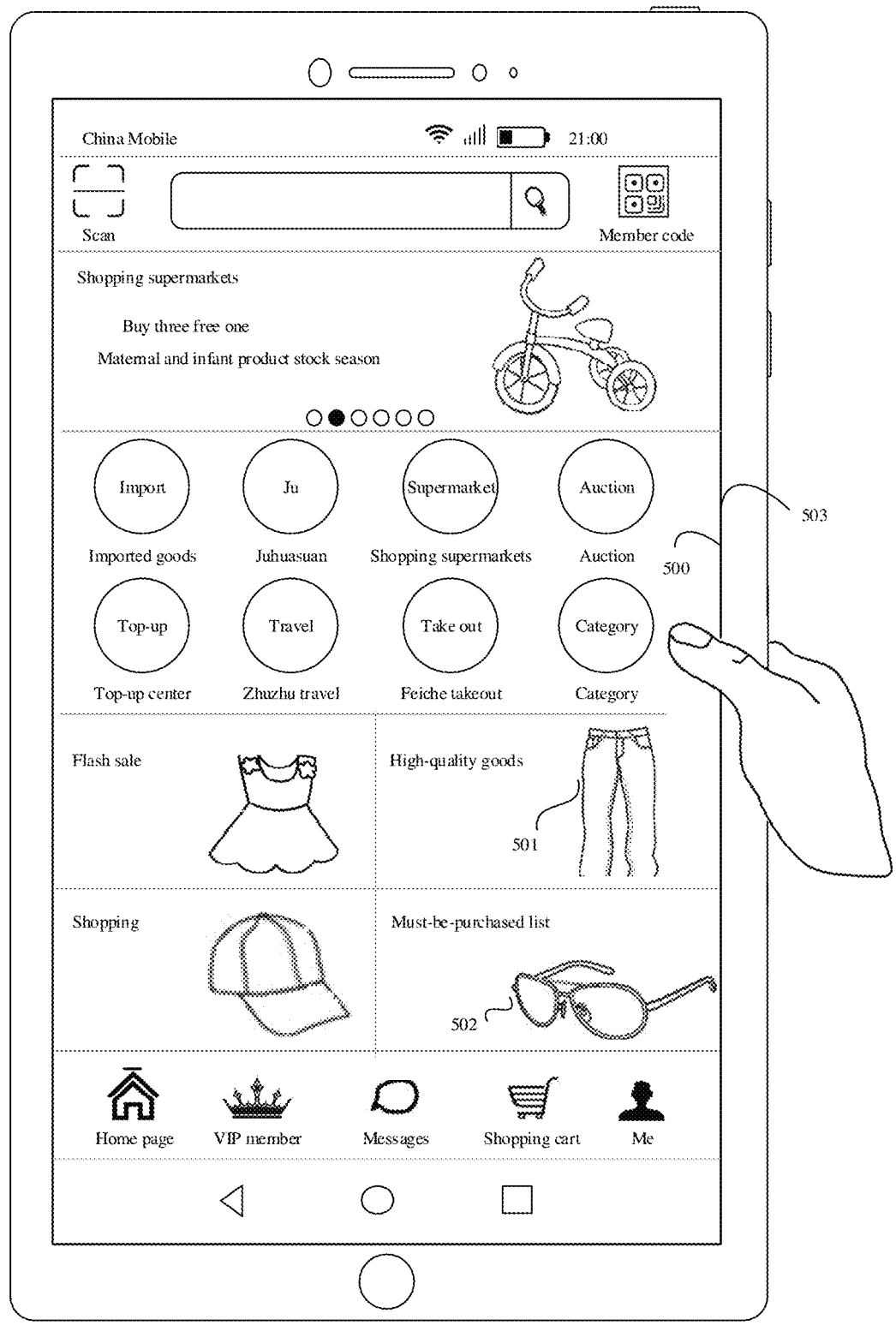
FIG. 5A and FIG. 5B are schematic diagrams of user interfaces in the conventional technology.
Figure 5B:
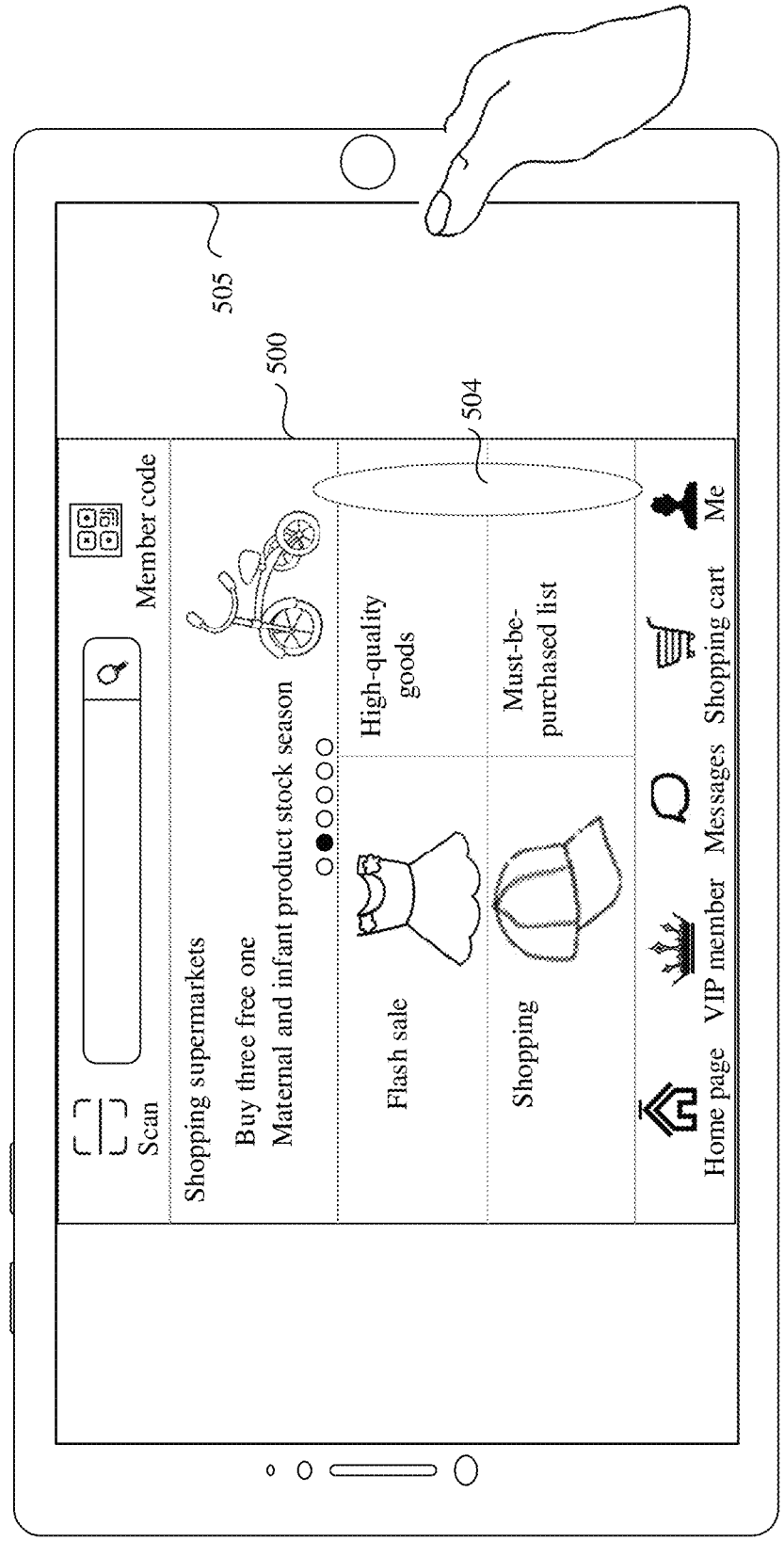

As shown in FIG. 4A and FIG. 4B, the switching between landscape and portrait is a case in which a display state of the user interface 401 is switched from displaying in a landscape posture in FIG. 4A to displaying in a portrait posture in FIG. 4B. Alternatively, as shown in FIG. 5A and FIG. 5B, the switching between landscape and portrait is a case in which a display state of a user interface 500 is switched from displaying in a portrait posture in FIG. 5A to displaying in a landscape posture in FIG. 5B. Briefly, the switching between landscape and portrait means that a display state of a user interface is switched from displaying in a landscape posture to displaying in a portrait posture, or a display state of a user interface is switched from displaying in a portrait posture to displaying in a landscape posture.

The portrait posture is a corresponding posture of the electronic device during the displaying in a portrait posture. A posture of the electronic device shown in FIG. 3A is the portrait posture.

The landscape posture is a corresponding posture of the electronic device during the displaying in a landscape posture. A posture of the electronic device shown in FIG. 3B is the landscape posture.

Figure 6A:
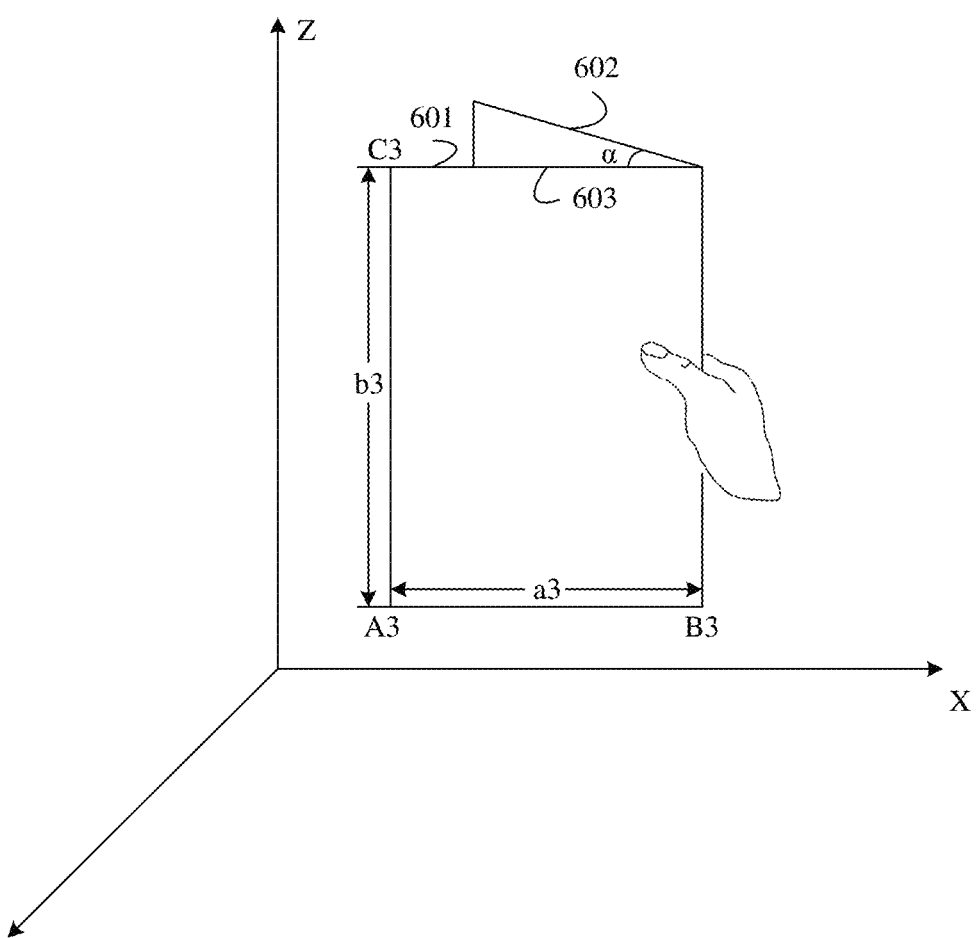
FIG. 6A and FIG. 6B are schematic diagrams of a foldable device according to an embodiment of this application.

As shown in FIG. 6A, the single-screen posture is a posture of the electronic device in which an included angle α between a display 601 and a display 602 of the electronic device is less than a second threshold. The electronic device may obtain the included angle α by using a gyro sensor. The second threshold is configured by a system of the electronic device. The second threshold may be 90°, 100°, 150°, or the like. This is not limited in example embodiments of the present disclosure.

As shown in FIG. 6A, the displaying in a single-screen posture is a corresponding display state in which a posture of the electronic device is the single-screen posture. During the displaying in a single-screen posture, a width of a user interface 603 displayed by the electronic device is equal to a width of the display 601, and a height of the user interface 603 displayed by the electronic device is equal to a height of the display 601.

Figure 6B:
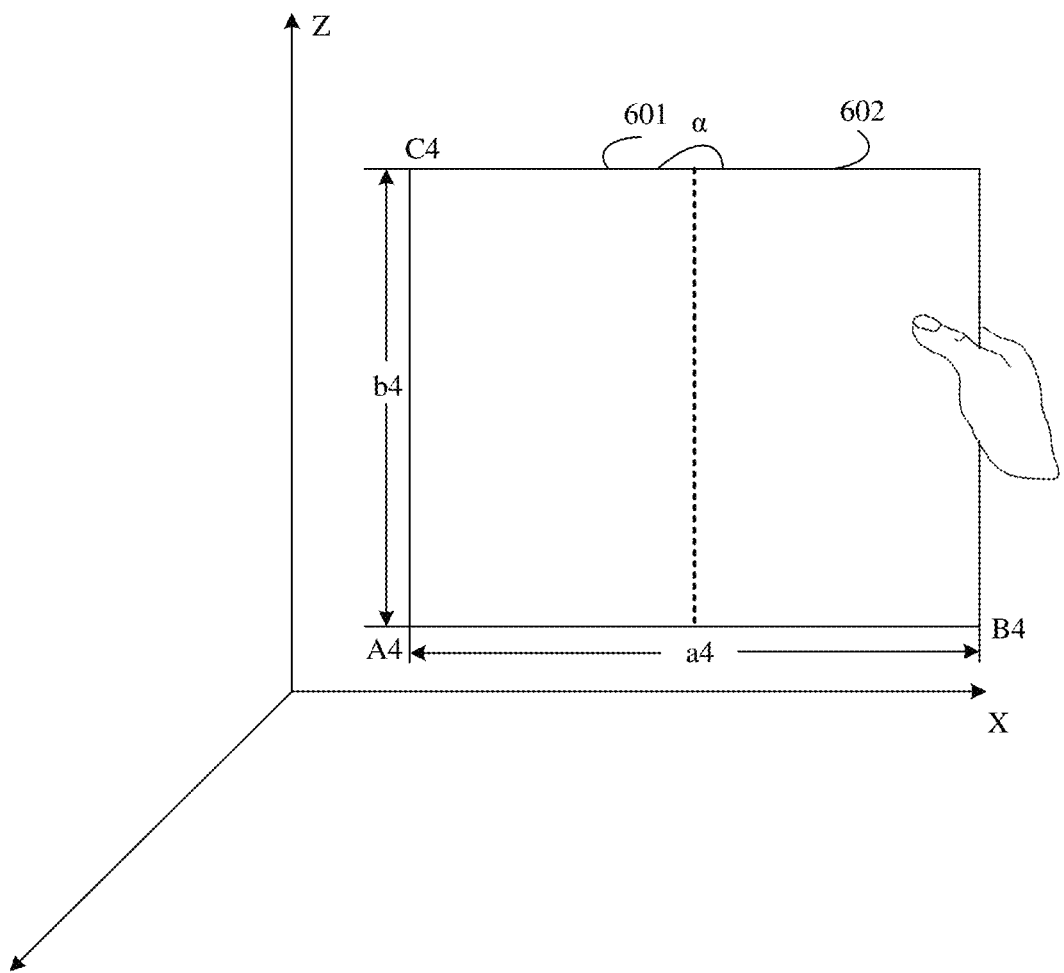

As shown in FIG. 6B, the large-screen posture is a posture of the electronic device in which the included angle α between the display 601 and the display 602 of the electronic device is greater than or equal to the second threshold.

As shown in FIG. 6B, the displaying in a large-screen posture is a corresponding display state in which a posture of the electronic device is the large-screen posture.

In embodiments of this application, postures of the electronic device may be a first posture and a second posture. The first posture may be the landscape posture or the single-screen posture. The second posture may be the portrait posture or the large-screen posture.

A tablet device may enable the function of switching between landscape and portrait. After the function of switching between landscape and portrait is enabled, application interfaces of some applications support the function of switching between landscape and portrait. For example, a "video play" application supports switching between landscape and portrait. The tablet device displays an application interface of the application in the landscape posture. When switching to the portrait posture, the tablet device is switched from displaying an application interface of the application in the landscape posture to displaying an application interface of the application in the portrait posture.

Application interfaces of other applications do not support switching between landscape and portrait. For example, a "WeChat" application does not support switching between landscape and portrait. The tablet device displays an application interface of the application in the portrait posture. When switching to the landscape posture, the tablet device still displays an application interface of the application in the portrait posture.

The foldable device may enable a function of adapting to a size change of a display. After the function of adapting to a size change of a display is enabled, application interfaces of some applications support the function of adapting to a size change of a display. For example, a "video play" application supports the function of adapting to a size change of a display. In the single-screen posture, the foldable device displays an application interface of the application on only a single display (for example, only the display 601). When switching to the large-screen posture, the foldable device is switched from displaying an application interface of the application on a single display to displaying an application interface of the application on a large display (that is, a large display formed by the display 601 and the display 602).

Application interfaces of other applications do not support the function of adapting to a size change of a display. For example, a "WeChat" application does not support the function of adapting to a size change of a display. The foldable device displays an application interface of the application on a single display in the single-screen posture. When switching to the large-screen posture, the foldable device still displays an application interface of the application on a single display.

However, in the conventional technology, user interfaces of some applications do not support switching between landscape and portrait, and can be displayed only in the portrait posture. For example, when the gyro sensor and the acceleration sensor detect that a posture of the electronic device is the landscape posture, user interfaces of applications such as "WeChat" and "Taobao" are displayed still in the portrait posture. This causes inconvenience for the user to watch displayed content.

To resolve the foregoing problem, in the conventional technology, when starting an application, the electronic device may obtain a size such as a width and a height of the display. When a user interface of the application needs to be switched between landscape and portrait, or a size of a display area on the display of the foldable device changes, the size of the display changes. The electronic device may determine a size of the user interface based on the size of the display obtained when the electronic device starts the application, and lay out an interface element of the user interface on the display whose size changes. However, when the user interface is switched between landscape and portrait, or the size of the display area on the display of the foldable device changes, the size of the display changes. However, the electronic device still lays out the interface element of the user interface based on the size of the display obtained when the electronic device starts the application. FIG. 4A and FIG. 4B are schematic diagrams of user interfaces. A display state of the user interface 401 is switched from displaying in a landscape posture in FIG. 4A to displaying in a portrait posture in FIG. 4B. A blank area shown by an elliptical box 402 in FIG. 4B appears in the user interface 401. FIG. 5A and FIG. 5B are also schematic diagrams of user interfaces. A display state of the user interface 500 is switched from displaying in a portrait posture in FIG. 5A to displaying in a landscape posture in FIG. 5B. Some interface elements (for example, an interface element 501 and an interface element 502) are not displayed in an elliptical box 504 in FIG. 5B in the user interface 500. In addition, when the above problem occurs in the user interface, the user may restart the application. However, the user interface that exists before the application is restarted is displayed only after the user performs several operations on the display. In this way, user operations are complex.

For a case in which layout disorder occurs in a user interface during switching between landscape and portrait in the conventional technology, the embodiments of this application provide a user interface layout method. When the user interface is switched between landscape and portrait, the method can reduce layout disorder that occurs in the user interface.

The following describes the user interface layout method provided in this application. An electronic device starts an application in response to an operation of a user. The electronic device detects a current posture, and obtains a size such as a width and a height of a display. The electronic device determines a width and a height of a to-be-displayed user interface (referred to as a first user interface in the following) based on the size such as the width and the height of the display. If the user interface of the application does not support switching between landscape and portrait, and the current posture of the electronic device is a first posture, the electronic device enlarges the width and the height of the first user interface to a size of a third user interface. The electronic device lays out an interface element of the first user interface based on a width and a height of the third user interface, and draws, in the third user interface, an interface element that is laid out. The electronic device then reduces the width and the height of the third user interface to the width and the height of the first user interface, and renders the reduced third user interface to the display.

When the electronic device is in the first posture, a user interface determined based on the size of the display may be referred to as the first user interface. A user interface obtained after the width and the height of the first user interface are enlarged is referred to as the third user interface. The width of the third user interface is a width of the display in a second posture of the electronic device. The height of the third user interface is obtained by multiplying the height of the first user interface by an enlargement ratio of the width of the first user interface.

In this way, when the posture of the electronic device changes, a display state of a user interface also changes adaptively. In addition, less layout disorder occur in an interface element of the user interface.

Figure 7:
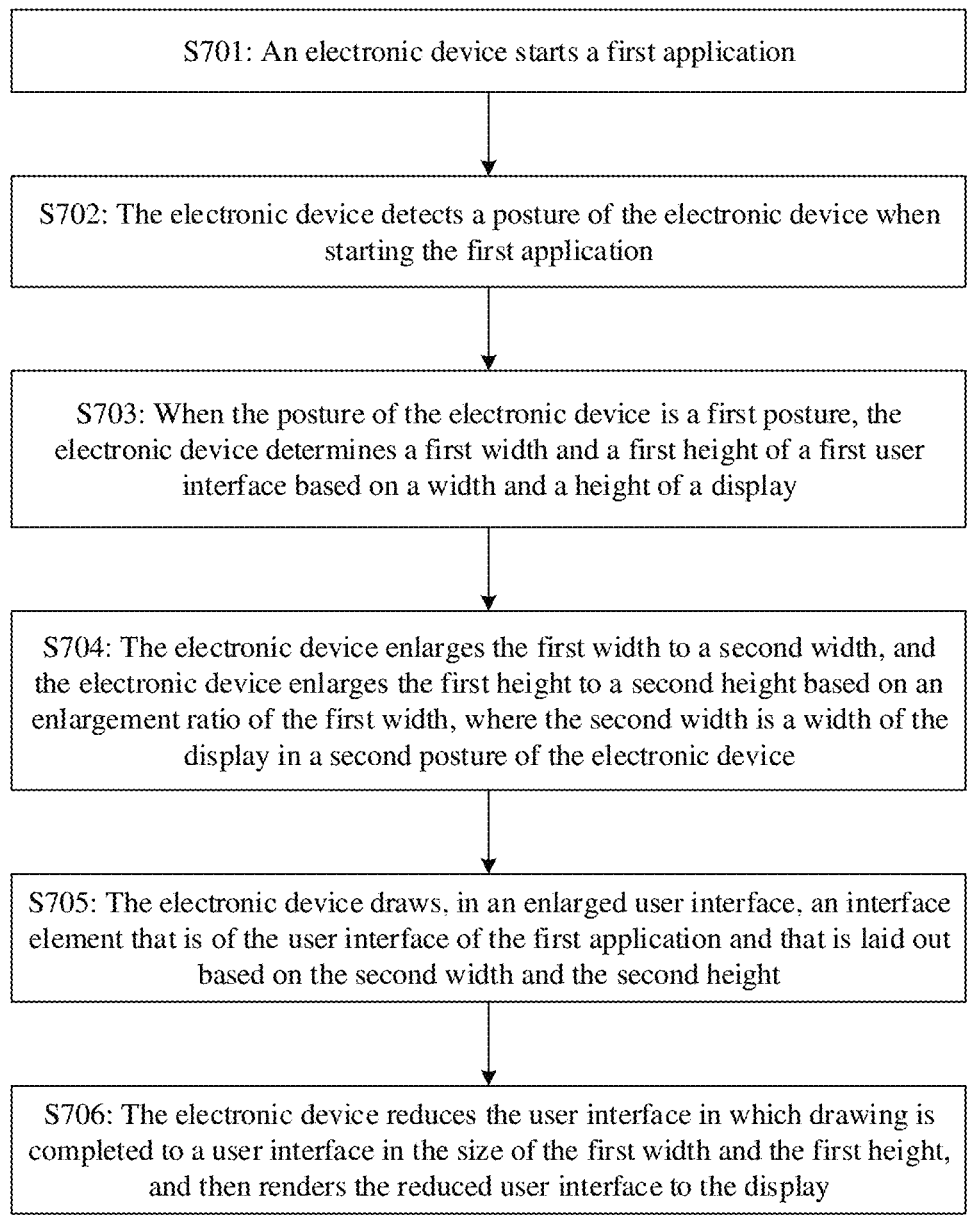
FIG. 7 is a schematic flowchart of a user interface layout method according to an embodiment of this application.

The following describes a user interface layout method provided in this application with reference to FIG. 7. As shown in FIG. 7, the user interface layout method provided in an embodiment of this application may include the following steps.

S701: An electronic device starts a first application.

The first application may be started in response to a tap operation performed by a user on an icon of the first application. Optionally, the first application may alternatively be started by using a voice control command (for example, Siri). The first application may alternatively be started in another application (for example, tapping a Taobao link in WeChat to open Taobao), and the like. This is not limited in example embodiments of the present disclosure. The first application may be a social application such as "WeChat", a shopping application such as "Taobao", or the like. The electronic device detects a width and a height of a display of the electronic device only when the electronic device starts the first application, and lays out an interface element of a user interface based on the height and the width of the display. After starting the first application, the electronic device does not detect changes of the width and the height of the display.

An application interface of the first application does not support switching between landscape and portrait. The electronic device obtains the width and height of the display only when the electronic device starts the first application. When a posture of the electronic device changes, the width and the height of the display also change. However, the first application does not detect the changes of the width and the height of the display.

S702: The electronic device detects a posture of the electronic device when starting the first application.

With reference to the diagram of the structure of the electronic device shown in FIG. 1, the electronic device may obtain magnitude and a direction of gravity of the electronic device by using the acceleration sensor 180E shown in FIG. 1, to determine the posture of the electronic device. The posture of the electronic device may be a first posture or a second posture. The first posture may be a landscape posture, a single-screen posture, or the like. In an implementation, the first posture is the landscape posture, and the second posture is a portrait posture. In another implementation, the first posture is the single-screen posture, and the second posture is a large-screen posture. When the electronic device detects the posture of the electronic device when starting the first application, the electronic device may further obtain a size of the display. The electronic device may detect the posture of the electronic device and obtain the size of the display in any sequence.

S703: When the posture of the electronic device is the first posture, the electronic device determines a first width and a first height of a first user interface based on the width and the height of the display.

When the posture of the electronic device is the first posture, the electronic device may use 1/f of the width of the display as the first width, where f is a real number greater than 1, and f may be configured by a system. The electronic device may obtain the height of the display as the first height.

S704: The electronic device enlarges the first width to a second width, and the electronic device enlarges the first height to a second height based on an enlargement ratio of the first width. The second width is a width of the display in the second posture of the electronic device.

The electronic device may further obtain the width of the display in the second posture of the electronic device as the second width. When the first posture is the landscape posture, the second width is a width of the display in the portrait posture of the electronic device. When the first posture is the single-screen posture, the second width is a width of the display in the large-screen posture of the electronic device. The enlargement ratio between the first width and the second width is S. S=Second width/First width, where "/" indicates a division sign. Second height=First height×S, where "×" represents a multiplication sign.

For example, as shown in FIG. 4A, the posture of the electronic device is the landscape posture. The electronic device displays a user interface 401 (e.g., the home page 401) of a Taobao application. The length of the side A1C1 of the user interface 401 is the first width. The length of the side A1B1 of the user interface 401 is the first height. As shown in FIG. 4B, the posture of the electronic device is the portrait posture. The width and the height of the user interface 401 are the same as the width and the height of the display. The length of the side D1E1 is the second width.

S705: The electronic device draws, in an enlarged user interface, an interface element that is of the user interface of the first application and that is laid out based on the second width and the second height.

Herein, a user interface obtained after the first width and the first height of the first user interface are enlarged to the second width and the second height may be referred to as a third user interface. The third user interface is the enlarged user interface. The electronic device lays out an interface element of a user interface of an application based on the width and the height of the third user interface. The interface element of the user interface of the first application is laid out based on the second width and the second height, and a layout of the third user interface is obtained. The electronic device draws the laid-out interface element in the third user interface. A user interface obtained after the second user interface is rendered is a user interface corresponding to the second gesture of the electronic device.

S706: The electronic device reduces the user interface in which drawing is completed to a user interface in the size of the first width and the first height, and then renders the reduced user interface to the display.

The following describes a process of rendering the user interface to the display provided in this embodiment of this application. The electronic device reduces the width of the user interface in which layout is completed from the second width to the first width and reduces the height of the user interface in which layout is completed from the second height to the first height. A CPU of the electronic device processes the reduced user interface into multi-dimensional graphics, and textures the graphics. The electronic device then invokes a GPU to rasterize the graphics. Finally, the electronic device projects the rasterized graphics onto the display. In this way, a user interface that can be viewed by the user can be obtained. The user interface finally displayed on the display may be the user interface 401 shown in FIG. 4A and FIG. 4B.

In the user interface layout method provided in this application, when the electronic device starts the first application in the first posture, the electronic device lays out the interface element in the first user interface based on a case in which the electronic device is in the second posture, that is, lays out the interface element based on a size of the second user interface. In this way, when the electronic device is switched from the first posture to the second posture, the interface element in the user interface is laid out as the electronic device is in the second posture. Therefore, the first user interface drawn by the electronic device can reduce layout disorder that occur in the user interface during switching between landscape and portrait, to improve convenience of use.

The following describes in detail the user interface layout method provided in this application with reference to Embodiment 1 and Embodiment 2.

In the embodiments of this application, the first user interface in a first size is referred to as the first user interface. The first user interface in a second size is referred to as the third user interface. The first size corresponds to the first width and the first height. The second size corresponds to the second width and the second height.

Embodiment 1: User Interface Layout for a Tablet Device

Figure 8A:
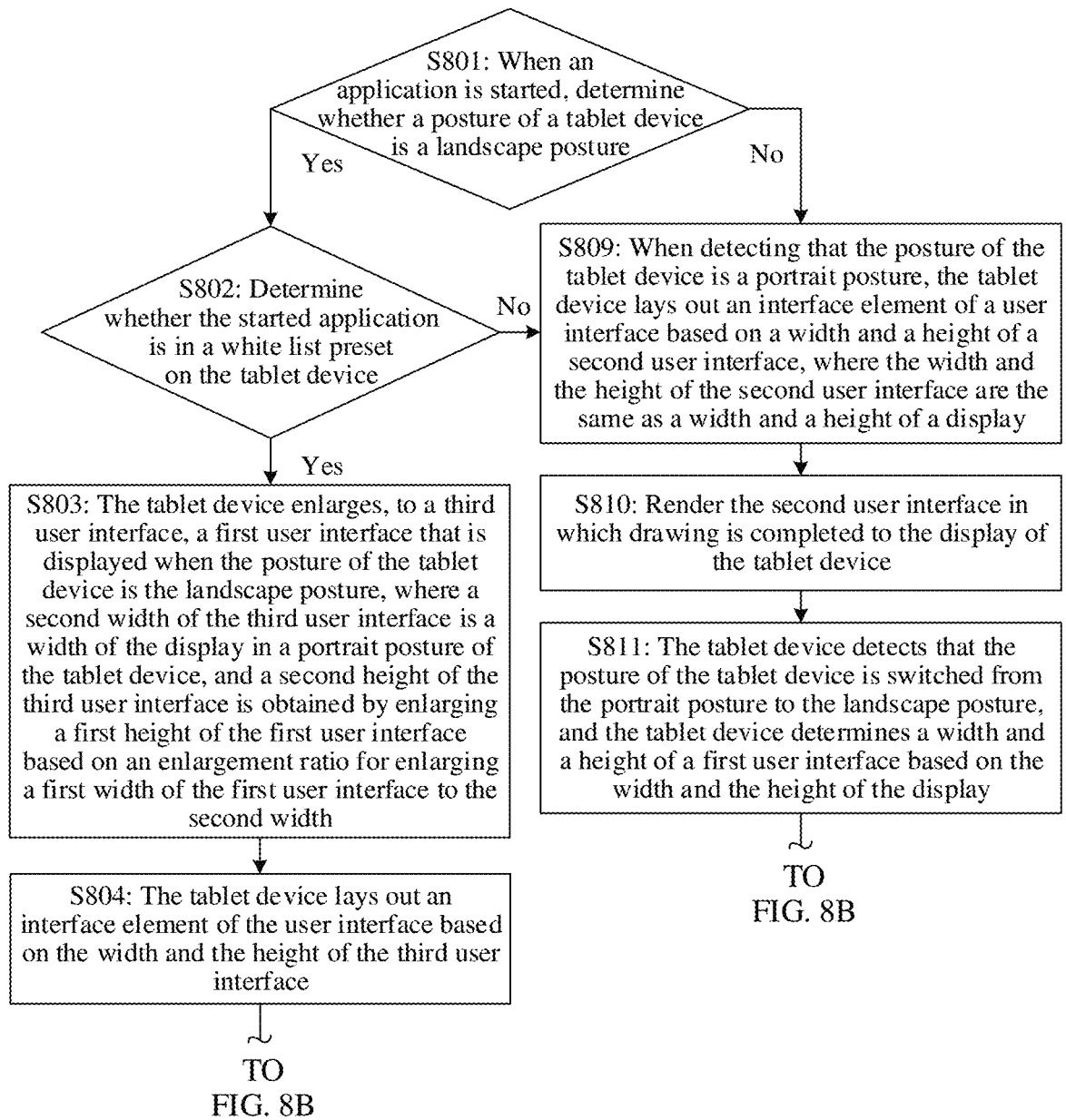
FIG. 8A and FIG. 8B are a schematic flowchart of a user interface layout method for a tablet device according to Embodiment 1 of this application.
Figure 8B:
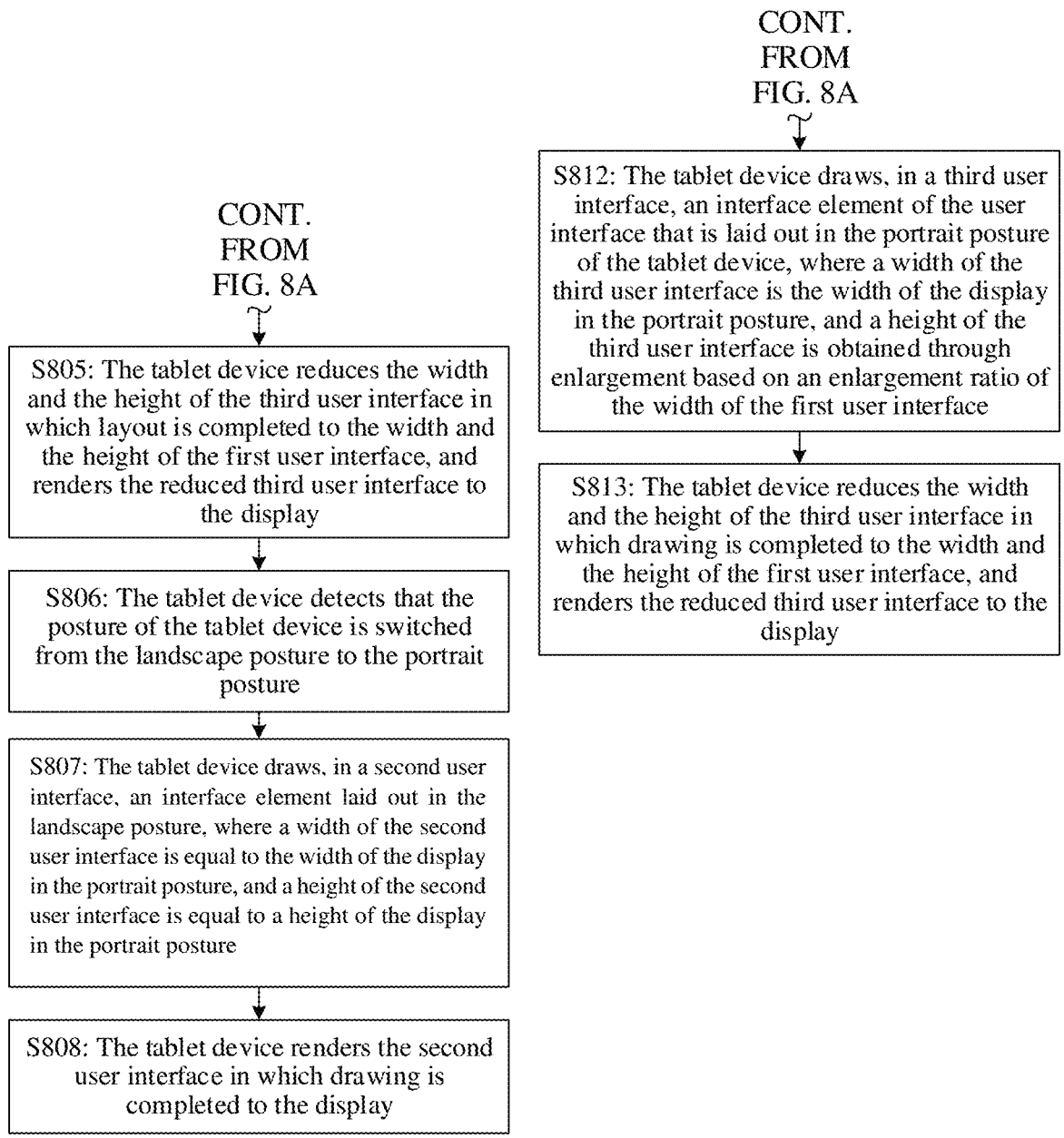

FIG. 8A and FIG. 8B show a user interface layout method for a tablet device according to Embodiment 1. The method includes the following steps.

S801: When the tablet device starts an application, the tablet device determines whether a posture of the tablet device is a landscape posture. If yes, S802 to S808 are performed. If no, S809 to S813 are performed.

Specifically, an acceleration sensor 180E in the tablet device may determine the posture of the tablet device based on a change of gravity acceleration and a center of gravity of the tablet device.

S802: The tablet device determines whether the started application is in a white list preset on the tablet device. If yes, S803 to S808 are performed. If no, S809 to S813 are performed.

For details of a starting manner of the application, refer to the description of step S701 in the example shown in FIG. 7. During switching of a user interface between landscape and portrait, this type of application does not obtain changes of a width and a height of a display, but obtains the width and the height of the display only when the tablet device starts the application.

Before starting the application, the tablet device determines whether a name corresponding to the application is in the white list preset by a system of the tablet device. The white list is configured by the system. An application corresponding to a name or an identifier in the white list obtains the width and the height of the display of the electronic device only when the tablet device starts the application, and an interface element of a user interface is laid out based on the height and the width of the display. During switching of a user interface between landscape and portrait, this type of application does not obtain the changes of the width and the height of display. If the identifier or the name of the application is in the white list, the application interface may be laid out according to steps S803 to S805. Otherwise, a user interface of the application is laid out according to steps S806 and S807.

Steps S803 to S805 describe a process of displaying a user interface of the application when the tablet device starts the application in the landscape posture.

S803: The tablet device enlarges, to a third user interface, a first user interface that is displayed when the posture of the tablet device is the landscape posture. A second width of the third user interface is a width of the display in a portrait posture of the tablet device. A second height of the third user interface is obtained by enlarging a first height of the first user interface based on an enlargement ratio for enlarging a first width of the first user interface to the second width.

Figure 9:
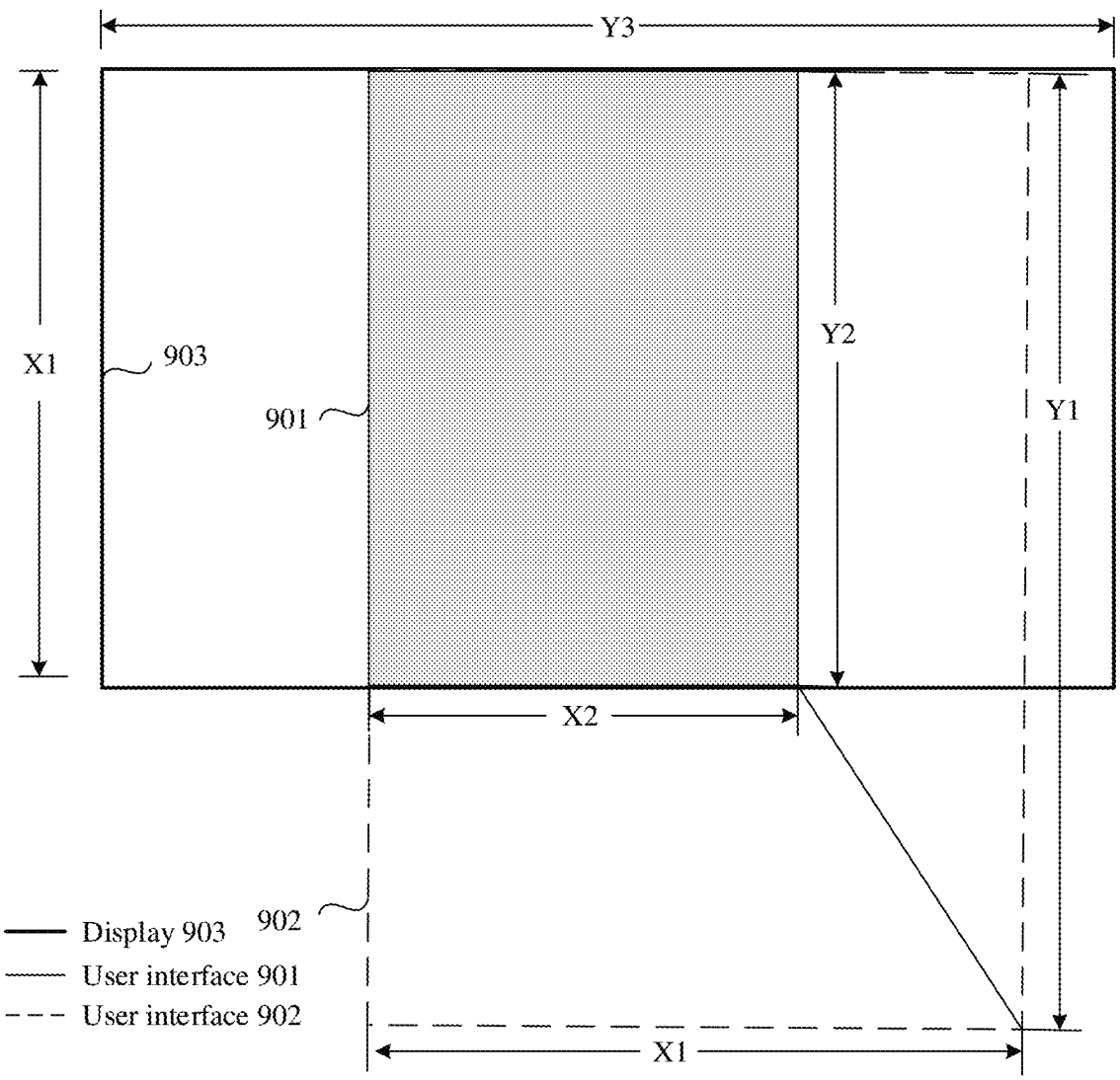
FIG. 9 is a schematic diagram of a user interface displayed by a tablet device in a landscape posture according to Embodiment 1 of this application.

FIG. 9 is a schematic diagram in which the tablet device displays a user interface in the landscape posture. A user interface 901 in FIG. 9 is the first user interface. A width of the user interface 901 is the first width, and the first width is X2. A height of the user interface 901 is the first height, and the first height is Y2. As shown in FIG. 9, when the tablet device is in the portrait posture, a width of a display 903 is X1, and a height of the display 903 is Y1. When the tablet device is in the portrait posture, a width and a height of a user interface are equal to a width and a height of the display. The width X2 of the user interface 901 is enlarged to the width X1 of the display 903 in the portrait posture of the tablet device, and the height Y2 of the user interface 901 is enlarged to Y1 based on an enlargement ratio of the width X1. A user interface 902 is a user interface obtained after the width and the height of the user interface 901 are enlarged. The user interface 902 is the third user interface. The width of the user interface 902 is the second width, and the second width is X1. The height of the user interface 902 is the second height, and the second height is Y1.

In FIG. 9, X1 is equal to Y2, and Y1 may be equal to Y3, may be less than Y3, or may be greater than Y3. Values of Y1 and Y3 depend on a size of a window on the tablet device in the portrait posture and a size of a window on the tablet device in the landscape posture. For example, assuming that X1=16 cm, X2=8 cm, Y3=32 cm, and Y2=X1=16 cm, Y1=Y2×(X1/X2)=32 cm, where "×" indicates the multiplication sign, and "/" indicates the division sign. Assuming that X1=15 cm, X2=10 cm, Y3=25 cm, and Y2=X1=15 cm, Y1=Y2×(X1/X2)=22.5 cm. Assuming that X1=16 cm, X2=8 cm, Y3=28 cm, and Y2=X1=16 cm, Y1=Y2×(X1/X2)=32 cm.

S804: The tablet device lays out an interface element of the user interface based on the width and the height of the third user interface.

The tablet device determines a size of the interface element based on a size of the third user interface, namely, a size of the user interface 902, and lays out and draws the interface element. Specifically, the tablet device determines a size and a position of each interface element in the user interface. Then, the tablet device draws, in the user interface, the interface element based on a size and a position in which the interface element is laid out.

S805: The tablet device reduces the width and the height of the third user interface in which layout is completed to the width and the height of the first user interface, and renders the reduced third user interface to the display.

The tablet device lays out the interface element of the user interface based on the width and the height of the user interface 902. After the layout is completed, the tablet device reduces the size of the user interface 902 to a size of the user interface 901, and renders the reduced user interface 902 to the screen. Specifically, a CPU of the tablet device processes the reduced user interface into multi-dimensional graphics, and textures the graphics. The tablet device then invokes a GPU to rasterize the graphics. Finally, the tablet device projects the rasterized graphics onto the display. In this way, a user interface that can be viewed by the user can be obtained.

S806 to S808 describe a process of displaying a user interface during switching from the landscape posture to the portrait posture.

S806: The tablet device detects that the posture of the tablet device is switched from the landscape posture to the portrait posture.

In an example embodiment, the tablet device may detect a posture change of the tablet device by using an acceleration sensor and a gyro sensor. For example, when the electronic device detects, by using the acceleration sensor and the gyro sensor, that a value of the gravity acceleration g is changed from a first acceleration value to a second acceleration value, the tablet device may determine that the posture of the tablet device is switched from the landscape posture to the portrait posture. The first acceleration value and the second acceleration value are configured by the system of the tablet device. The first acceleration value may be a value having both a direction and a size. The second acceleration value may be a value having both a direction and a size.

S807: The tablet device draws, in a second user interface, an interface element laid out in the landscape posture, where a width of the second user interface is equal to the width of the display in the portrait posture, and a height of the second user interface is equal to a height of the display in the portrait posture.

The tablet device obtains the width and the height of the display in the portrait posture. However, the tablet device does not report the obtained width and height of the display to an application layer. The tablet device does not need to lay out an interface element of the user interface again based on the obtained width and height of the display. The tablet device draws, in the third user interface, the interface element that is laid out in the landscape posture. The width of the third user interface is equal to the width of the display in the portrait posture, and the height of the third user interface is equal to the height of the display in the portrait posture.

S808: The tablet device renders the second user interface in which drawing is completed to the display.

For a specific process in which the tablet device renders the second user interface in which drawing is completed to the display, refer to the description of rendering the user interface to the display by the tablet device in step S805.

S809 and S810 describe a process of displaying a user interface of the application when the tablet device starts the application in the portrait posture of the tablet device.

S809: When detecting that the posture of the tablet device is the portrait posture, the tablet device lays out an interface element of the user interface based on a width and a height of a second user interface. The width and the height of the second user interface are the same as a width and a height of the display respectively.

The tablet device first obtains the width and the height of the display, and then lays out a size and a position of the interface element of the user interface in the user interface based on the width and the height of the display. Then, the tablet device draws the laid-out interface element in a to-be-displayed user interface, where a width of the to-bedisplayed user interface is equal to the width of the display, and a height of the to-be-displayed user interface is equal to the height of the display.

As shown in FIG. 9, when the posture of the tablet device is the portrait posture, the width of the display may be X1, and the height of the display may be Y3.

S810: Render the second user interface in which drawing is completed to the display of the tablet device.

Specifically, a CPU of the tablet device processes the to-be-displayed user interface in which drawing is completed into multi-dimensional graphics, and textures the graphics. The tablet device then invokes a GPU to rasterize the graphics. Finally, the tablet device projects the rasterized graphics onto the display. In this way, a user interface that can be viewed by the user can be obtained.

S811 to S813 describe a process of displaying a user interface during switching from the portrait posture to the landscape posture.

S811: The tablet device detects that the posture of the tablet device is switched from the portrait posture to the landscape posture, and the tablet device determines a width and a height of a first user interface based on the width and the height of the display.

For step S811, refer to the description in step S703 in which the electronic device determines the width and the height of the user interface based on the width and the height of the display.

S812: The tablet device draws, in a third user interface, an interface element of the user interface that is laid out in the portrait posture of the tablet device. A width of the third user interface is the width of the display in the portrait posture, and a height of the third user interface is obtained through enlargement based on an enlargement ratio of the width of the first user interface.

For a process of drawing the interface element in step S812, refer to the description of drawing the interface element in the user interface in step S804.

S813: The tablet device reduces the width and the height of the third user interface in which drawing is completed to the width and the height of the first user interface, and renders the reduced third user interface to the display.

For this step, refer to the description of the rendering process of the user interface in which drawing is completed in step S706.

According to the user interface layout method for the tablet device provided in this embodiment of this application, when the tablet device starts the application in the landscape posture, the tablet device lays out the interface element in the first user interface as the tablet device is in the portrait posture, that is, lays out the interface element based on the width and the height of the second user interface. In this way, when the tablet device is switched from the landscape posture to the portrait posture, because the tablet device lays out the interface element of the user interface as the tablet device is in the portrait posture, the first user interface drawn by the tablet device can reduce layout disorder that occur in the user interface during switching between landscape and portrait, to improve convenience of use.

Embodiment 2: User Interface Layout for a Foldable Device

Figure 10A:
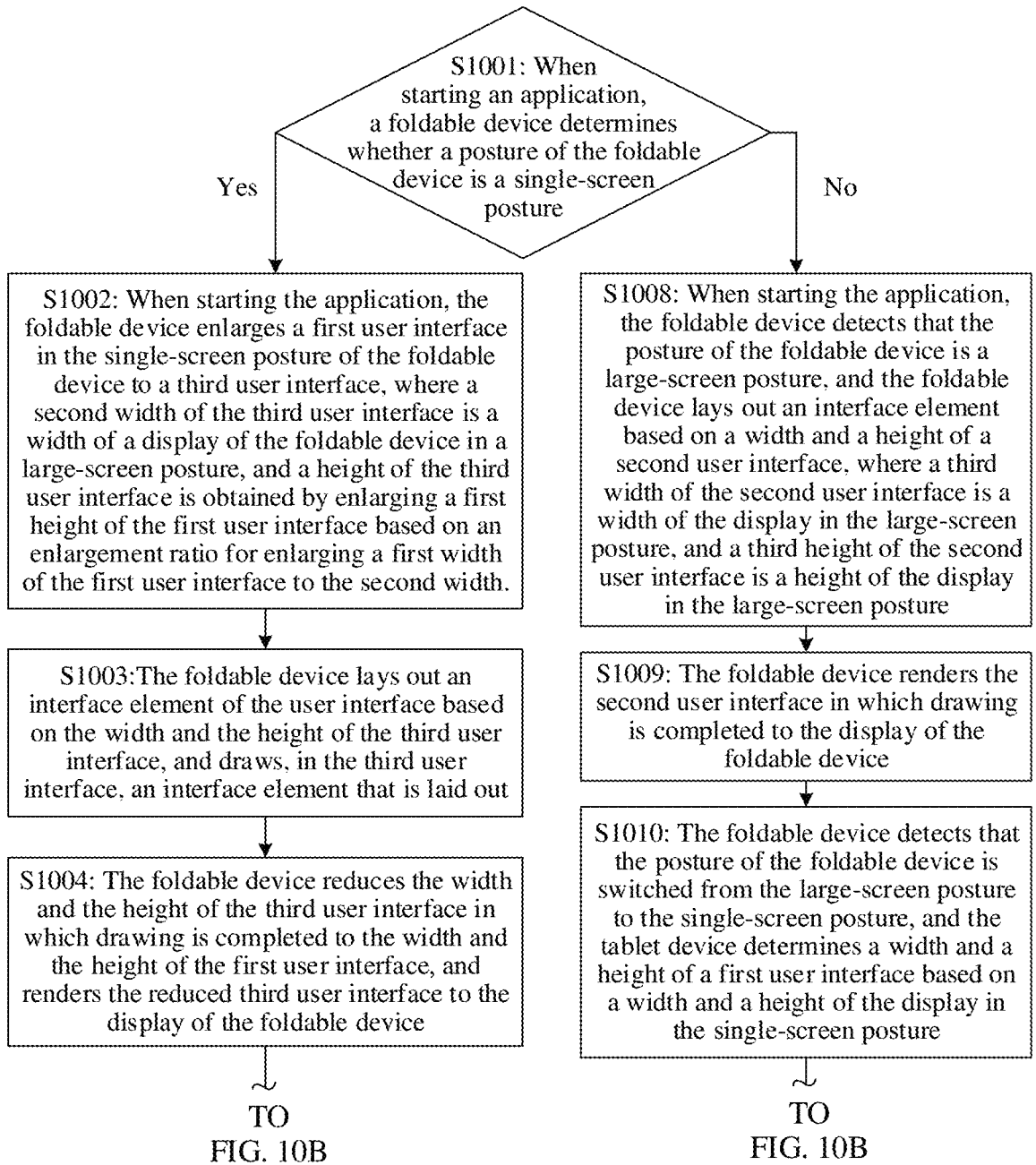
FIG. 10A and FIG. 10B are a schematic flowchart of a user interface layout method for a foldable device according to Embodiment 2 of this application.
Figure 10B:
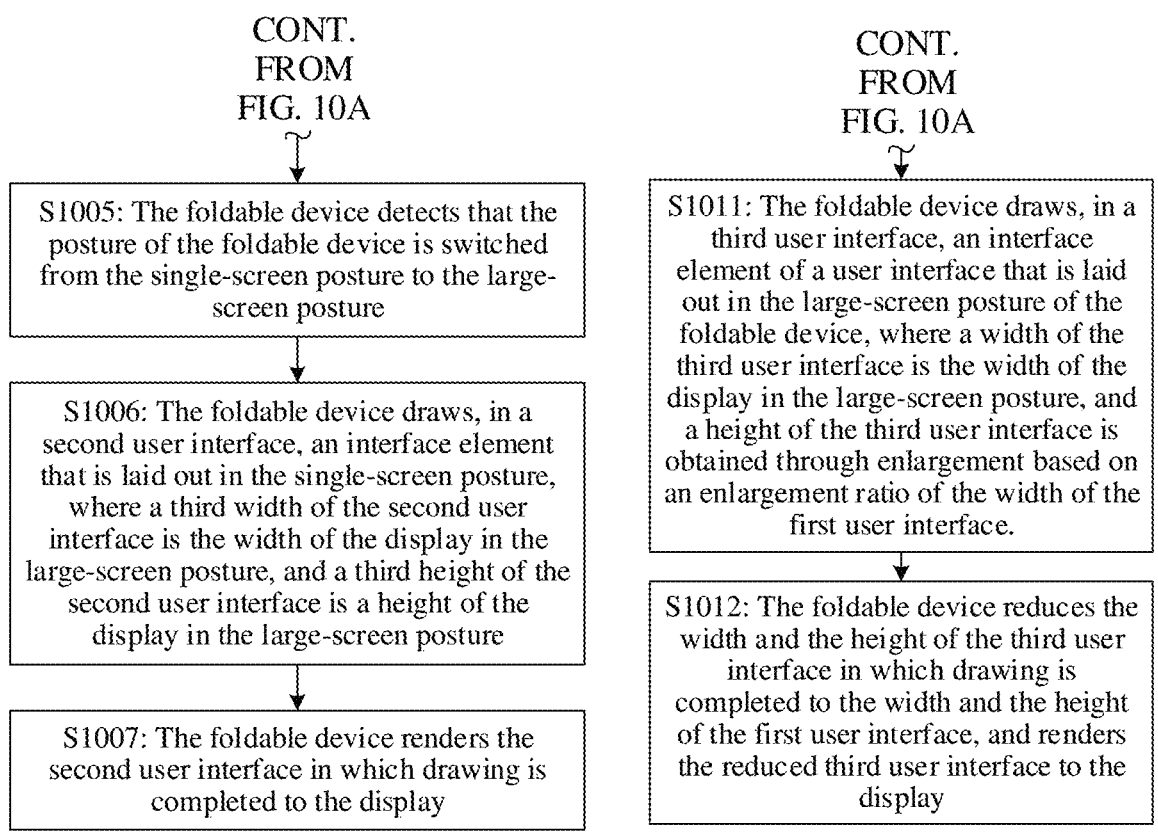

FIG. 10A and FIG. 10B show a user interface layout method for a foldable device according to Embodiment 2. The method includes the following steps.

S1001: When starting an application, the foldable device determines whether a posture of the foldable device is a single-screen posture. If yes, S1002 to S1007 are performed. If no, S1008 to S1012 are performed.

In an embodiment, when starting the application, the foldable device may determine the posture of the foldable device by using an acceleration sensor and a gyro sensor.

S1002 to S1004 describe a process of displaying a user interface of the application when the foldable device starts the application in the single-screen posture of the foldable device.

S1002: When starting the application, the foldable device enlarges a first user interface in the single-screen posture of the foldable device to a third user interface. A second width of the third user interface is a width of a display in a large-screen posture of the foldable device. A second height of the third user interface is obtained by enlarging a first height of the first user interface based on an enlargement ratio for enlarging a first width of the first user interface to the second width.

Specifically, the foldable device may obtain a width of the display in the single-screen posture of the foldable device as the width of the first user interface, namely, the first width. The foldable device may obtain a height of the display in the single-screen posture of the foldable device as the height of the user interface, namely, the first height. The foldable device may obtain a width of the display in the large-screen posture of the foldable device as the width of the third user interface, namely, the second width.

Figure 11:
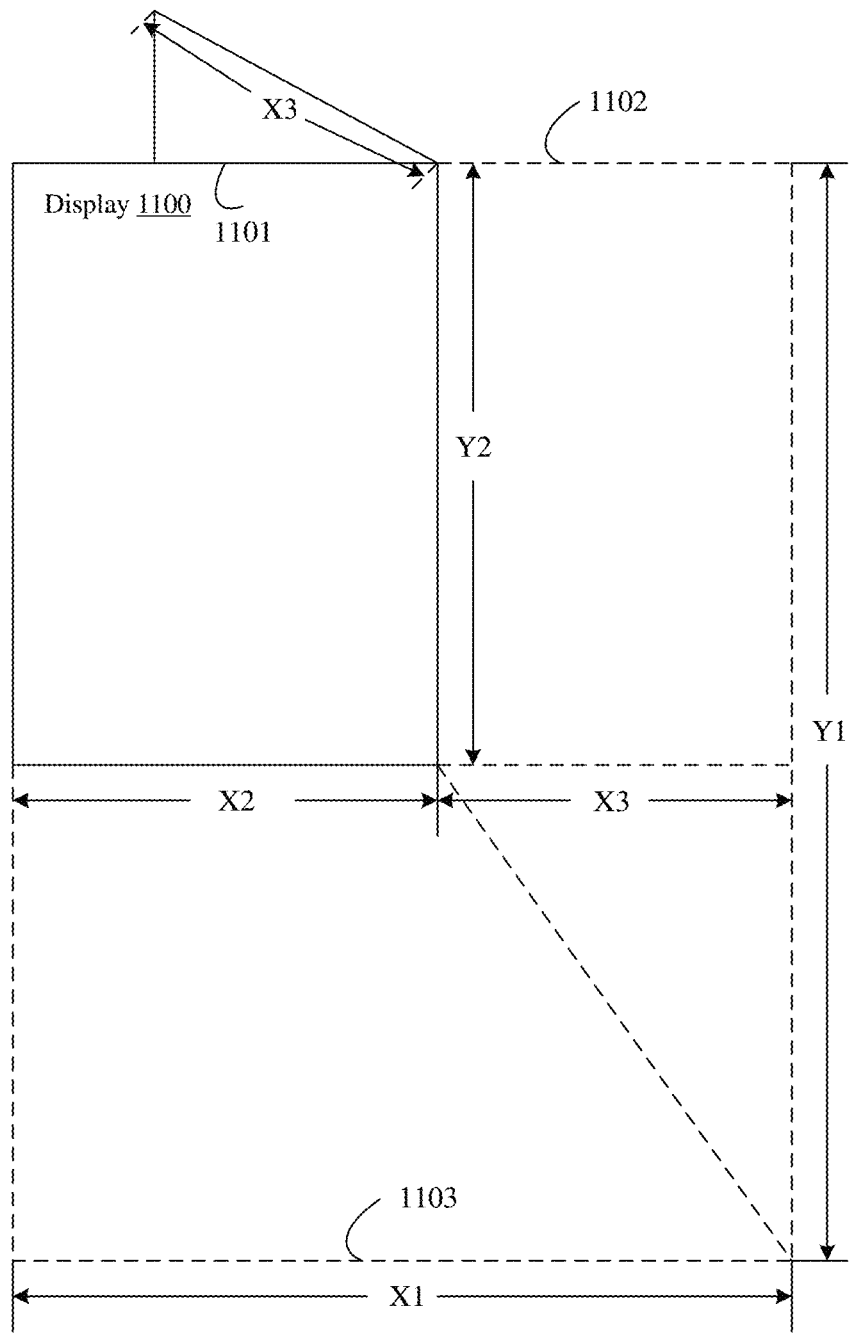
FIG. 11 is a schematic diagram of a user interface displayed by a foldable device in a single-screen posture according to Embodiment 2 of this application.

FIG. 11 is a schematic diagram of a user interface that is displayed by the foldable device in the single-screen posture. In FIG. 11, when the posture of the foldable device is the single-screen posture, a width of a display 1100 is X2, and a height of the display 1100 is Y2. A width of a user interface 1101 is X2, and a height of the user interface 1101 is Y2. In FIG. 11, when the posture of the foldable device is the large-screen posture, a width of a user interface 1102 is (X2+X3), and a height of the user interface 1102 is Y2. In FIG. 9, a user interface 1103 is a user interface, namely, the third user interface, that is obtained after the width of the user interface 1101 is enlarged to the width of the user interface 1102, and the height of the user interface 1101 is also proportionally enlarged. A width of the user interface 1103 is X1, and X1=(X2+X3). A height of the user interface 1103 is Y1, and Y1=Y2×(X1/X2), where "×" indicates the multiplication sign, and "/" indicates the division sign.

Herein, when the display of the foldable device is switched between a single-screen display state and a large-screen display state, the user interface of the application started by the foldable device does not support adapting to a size change of the display for displaying.

S1003: The foldable device lays out an interface element of the user interface based on the width and the height of the third user interface, and draws, in the third user interface, an interface element that is laid out.

The foldable device determines a position and a size of the interface element of the user interface in the user interface based on the width and the height of the user interface 1103. Then, the foldable device draws the interface element in the user interface based on the determined size and position.

S1004: The foldable device reduces the width and the height of the third user interface in which drawing is completed to the width and the height of the first user interface, and renders the reduced third user interface to the display of the foldable device.

The width and the height of the user interface in which layout is completed are the same as the width and the height of the user interface 1103. In this case, the foldable device reduces the width and the height of the user interface in which layout is completed to the width and the height of the user interface 1101. The foldable device then renders the reduced user interface to the display. Specifically, a CPU of the foldable device processes the reduced user interface into multi-dimensional graphics, and textures the graphics. The foldable device then invokes a GPU to rasterize the graphics. Finally, the foldable device projects the rasterized graphics onto the display. In this way, a user interface that can be viewed by the user can be obtained.

S1005 to S1007 describe a process of displaying a user interface during switching from the single-screen posture to the large-screen posture.

S1005: The foldable device detects that the posture of the foldable device is switched from the single-screen posture to the large-screen posture.

A process in which the foldable device detects posture switching of the foldable device may be similar to the description in step S806 in which the tablet device detects posture switching of the tablet device.

S1006: The foldable device draws, in a second user interface, an interface element that is laid out in the single-screen posture, where a third width of the second user interface is the width of the display in the large-screen posture, and a third height of the second user interface is a height of the display in the large-screen posture.

For a drawing process of the laid-out interface element, refer to the description of the drawing process of the laid-out interface element in step S1003.

S1007: The foldable device renders the second user interface in which drawing is completed to the display.

For step S1007, refer to S1004.

S1008 and S1009 describe a process of displaying a user interface of the application when the foldable device starts the application in the large-screen posture of the foldable device.

S1008: When starting the application, the foldable device detects that the posture of the foldable device is the large-screen posture, and the foldable device lays out an interface element based on a width and a height of a second user interface, where a third width of the second user interface is a width of the display in the large-screen posture, and a third height of the second user interface is a height of the display in the large-screen posture.

When starting the application, the foldable device detects, by using the acceleration sensor and the gyro sensor, the posture of the foldable device. After determining that the posture of the foldable device is the large-screen posture, the foldable device obtains the width and the height of the display. The foldable device lays out a size and a position of an interface element of the user interface in the user interface based on the width and the height of the display.

When the posture of the foldable device is the large-screen posture, a width and a height of a user interface are the same as the width and the height of the display. A user interface 1102 shown in FIG. 11 is a user interface that is displayed when the posture of the foldable device is the large-screen posture. A width of the user interface 1102 is (X2+X3), and a height of the user interface 1102 is Y2. That is, the width of the display is (X2+X3), and the height of the display is Y2.

S1009: The foldable device renders the second user interface in which drawing is completed to the display of the foldable device.

Specifically, a CPU of the foldable device processes the user interface in which layout is completed into multi-dimensional graphics, and textures the graphics. The foldable device then invokes a GPU to rasterize the graphics. Finally, the foldable device projects the rasterized graphics onto the display. In this way, a user interface that can be viewed by the user can be obtained.

S1010 to S1012 describe a process of displaying a user interface during switching from the large-screen posture to the single-screen posture.

S1010: The foldable device detects that the posture of the foldable device is switched from the large-screen posture to the single-screen posture, and the tablet device determines a width and a height of a first user interface based on a width and a height of the display in the single-screen posture.

For step S1010, refer to the description in step S703 in which the electronic device determines the width and the height of the user interface based on the width and the height of the display.

S1011: The foldable device draws, in a third user interface, an interface element of a user interface that is laid out in the large-screen posture of the foldable device. A width of the third user interface is the width of the display in the large-screen posture. A height of the third user interface is obtained through enlargement based on an enlargement ratio of the width of the first user interface.

For step S1011, refer to S1003.

S1012: The foldable device reduces the width and the height of the third user interface in which drawing is completed to the width and the height of the first user interface, and renders the reduced third user interface to the display.

For step S1012, refer to the description of the rendering process of the user interface in step S1004.

According to the user interface layout method for the foldable device provided in this embodiment of this application, when the foldable device starts the application in the single-screen posture, the foldable device lays out the interface element in the first user interface as the foldable device is in the large-screen posture, that is, lays out the interface element based on the width and the height of the second user interface. In this way, when the foldable device is switched from the single-screen posture to the large-screen posture, the foldable device lays out the interface element of the user interface as the foldable device is in the portrait posture. Therefore, the first user interface drawn by the foldable device can reduce layout disorder that occur in the user interface during switching between the single-screen posture and the large-screen posture, to improve convenience of use.

With reference to the user interface layout method in this application, workflows of software and hardware of the electronic device 100 are described as an example.

Figure 12:
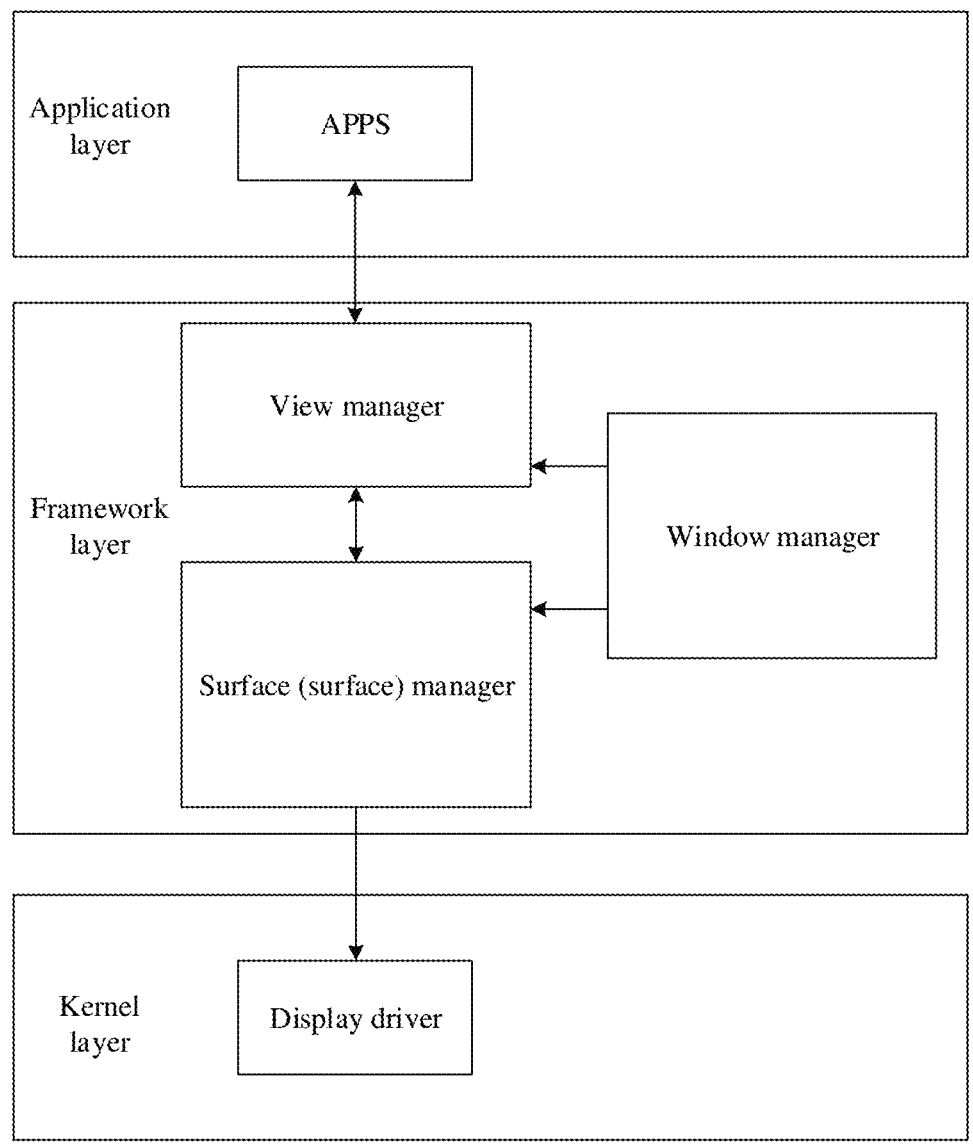
FIG. 12 is a schematic diagram of implementing a user interface layout method in this application by software and hardware of an electronic device according to this application.

As shown in FIG. 12, a kernel layer, a framework layer, and an application layer in FIG. 12 respectively correspond to the kernel layer, the application framework layer, and the application layer in FIG. 2.

The window manager is responsible for managing a size such as a width and a height of a user interface of an application. The window management module sends the size of the user interface to a view management module and a surface management module. When the electronic device displays a user interface in a first posture (for example, when a tablet device displays a user interface in a landscape posture, or when a foldable device displays a user interface in a single-screen posture), the window management module first sends a size of the enlarged user interface to the view management module and the surface management module.

The view manager sends the size of the user interface to the application layer, and the application determines, based on the size of the user interface, a quantity of interface elements to be displayed in the user interface of the application, and sends the interface element of the user interface to the view management module. The view management module lays out the interface element based on the size of the user interface. An XML file of the user interface is drawn into the interface element. The view management module sends the laid-out interface element (a position on a surface) to the surface management module.

The surface manager draws, in the user interface, the interface element laid out by the view management module. Then, the surface management module reduces the size of the user interface in which drawing is completed to a size of a to-be-displayed user interface, and sends the to-be-displayed user interface to the display module.

A display driver is configured to render the to-be-displayed user interface.

According to the user interface layout method provided in this application, when the electronic device starts a first application in the first posture, the electronic device lays out an interface element of the user interface as the electronic device is in a second posture, that is, lays out the interface element based on a width of a second user interface. In this way, when the electronic device is switched from the first posture to the second posture, an interface element of the user interface is laid out based on the width of the display in the second posture of the electronic device. Therefore, the first user interface drawn by the electronic device can reduce layout disorder that occur in the user interface during switching between landscape and portrait, to improve convenience of use.

Figure 13A:
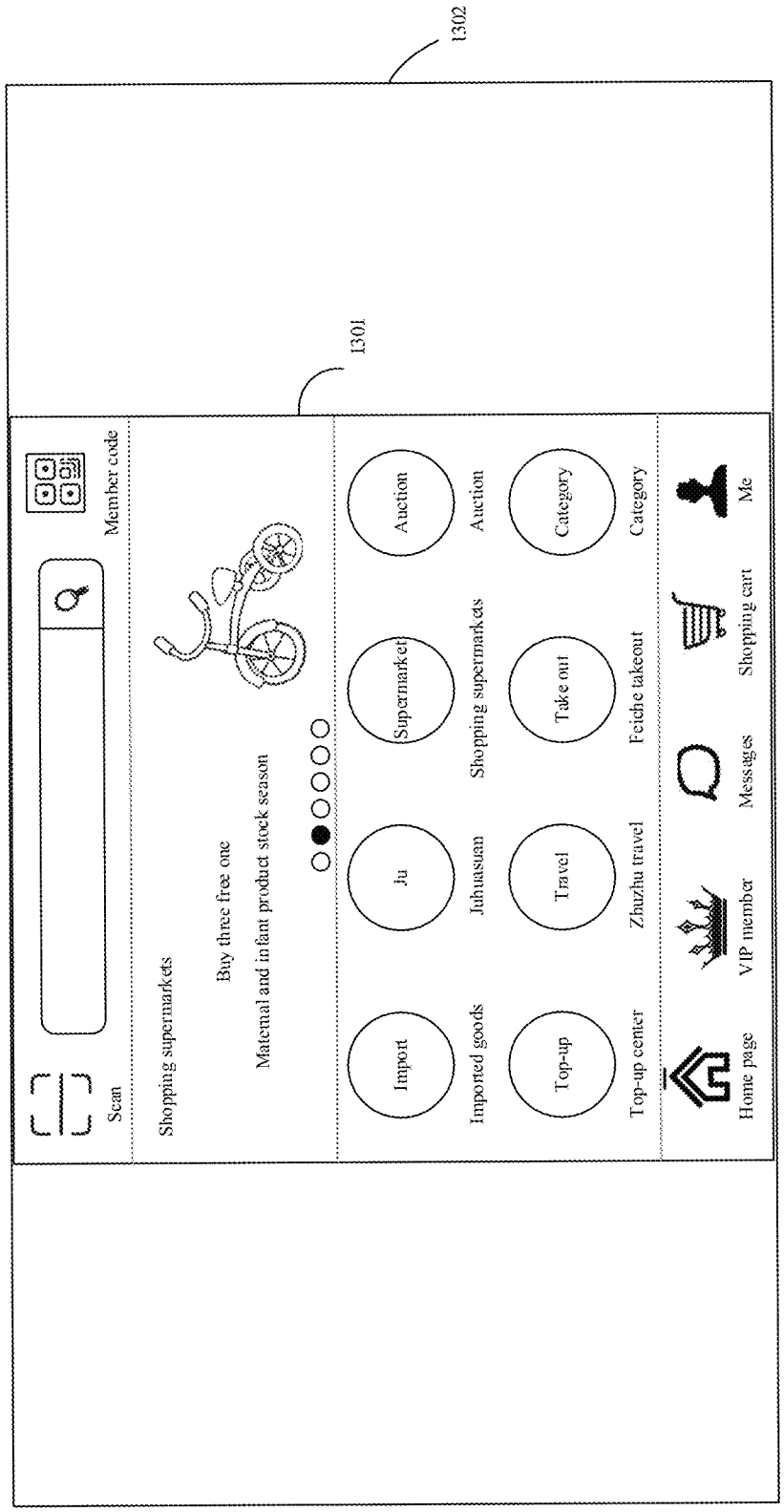
FIG. 13A and FIG. 13B are schematic diagrams of user interfaces according to an embodiment of this application.
Figure 13B:
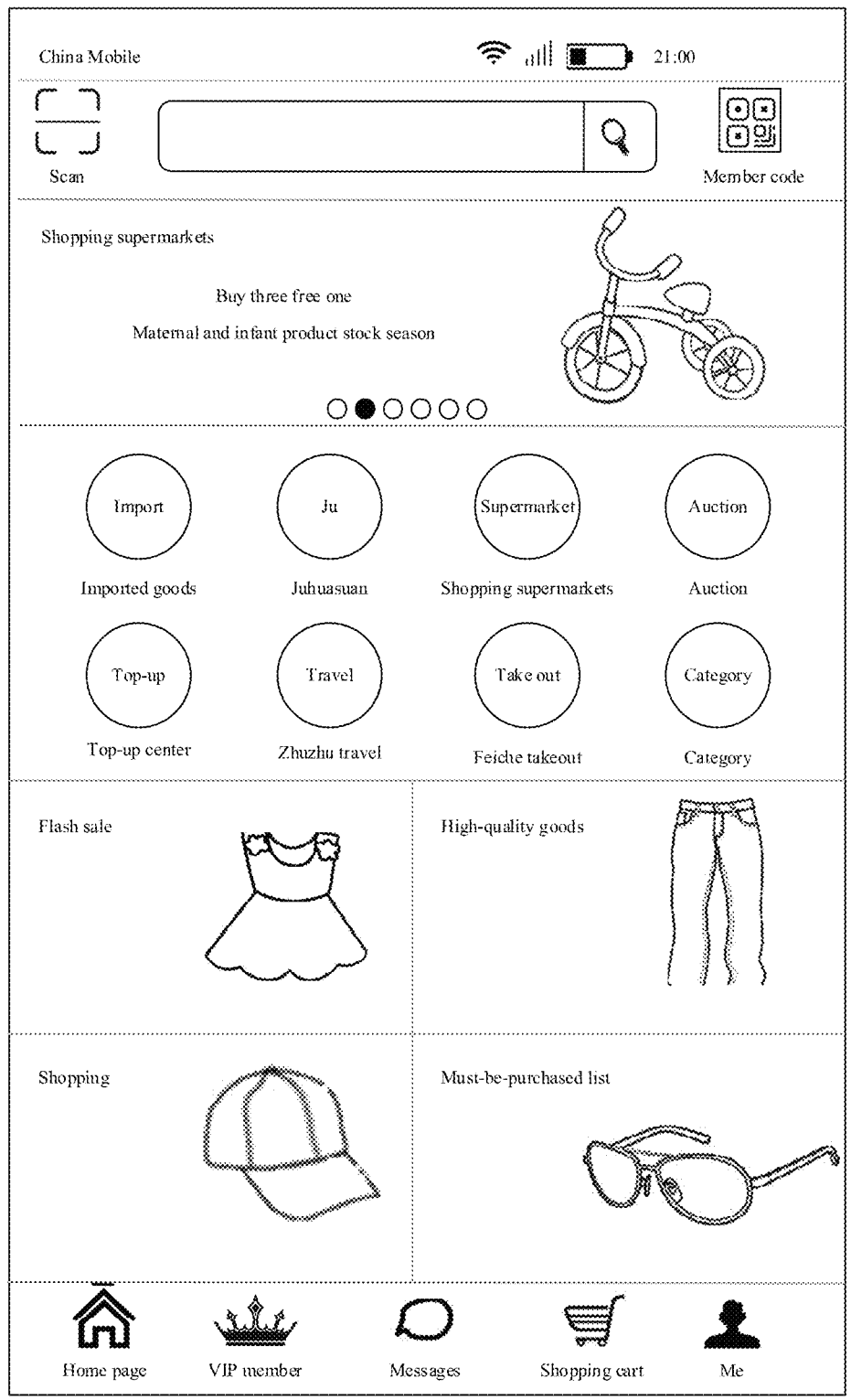
Figure 14A:
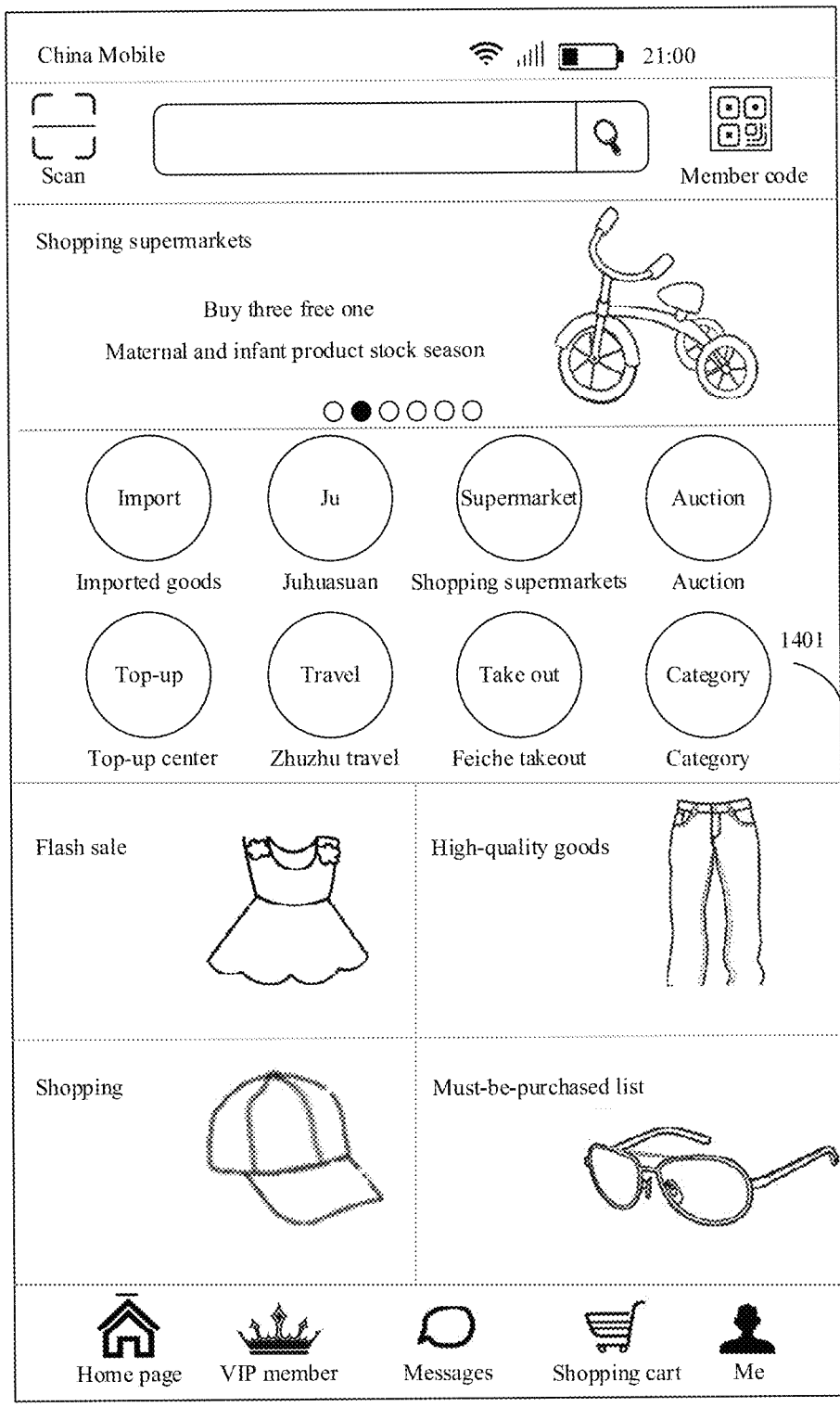
FIG. 14A and FIG. 14B are schematic diagrams of user interfaces according to an embodiment of this application.
Figure 14B:
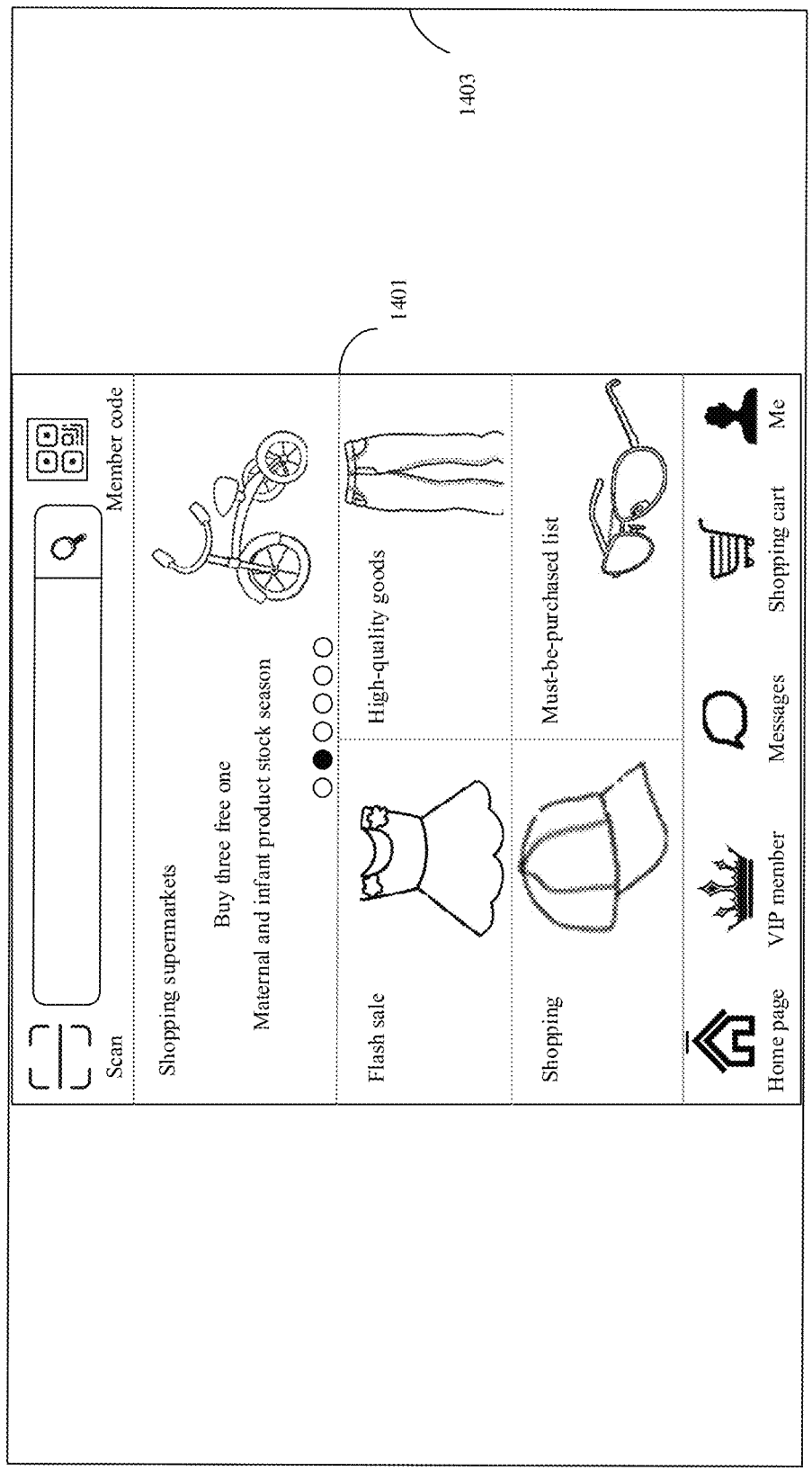

The electronic device lays out a user interface according to the user interface layout method provided in this application. A posture of the electronic device is switched from a landscape posture to a portrait posture, and the elliptical box 402 in FIG. 4B does not appear in the user interface. As shown in FIG. 13A and FIG. 13B, a user interface of Taobao in the landscape posture of the electronic device in FIG. 13A is changed to a user interface of Taobao in a portrait posture of the electronic device in FIG. 13B. A posture of the electronic device is switched from the portrait posture to the landscape posture, and a case in which the interface element 502 and the interface element 503 are not displayed in the elliptic box 504 in FIG. 5B does not occur in the user interface. As shown in FIG. 14A and FIG. 14B, a user interface of Taobao in the portrait posture of the electronic device in FIG. 14A is changed to a user interface of Taobao in the landscape posture of the electronic device in FIG. 14B.

Figure 15A:
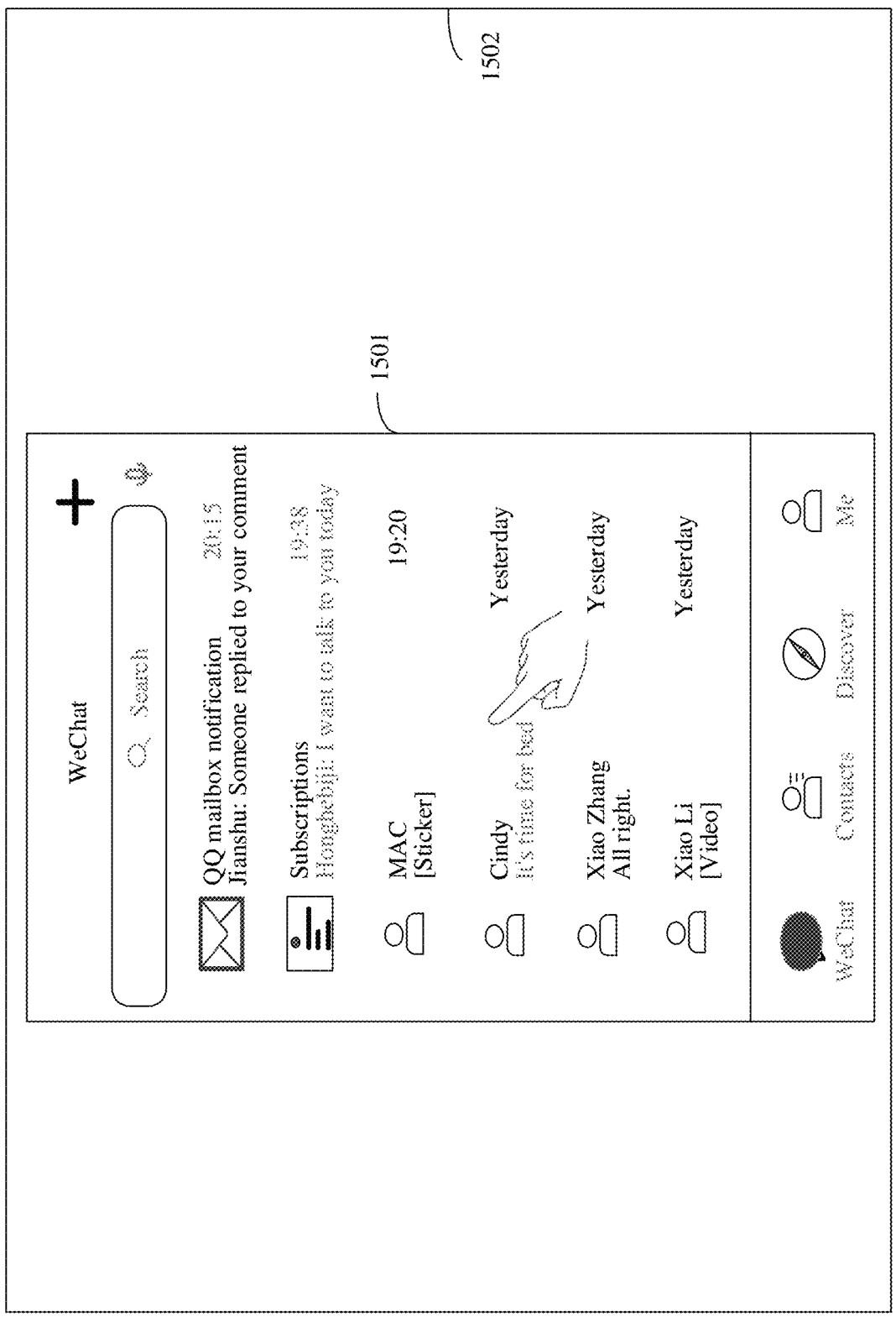
FIG. 15A and FIG. 15B are schematic diagrams of user interfaces displayed by an electronic device in a landscape posture according to an embodiment of this application.
Figure 15B:
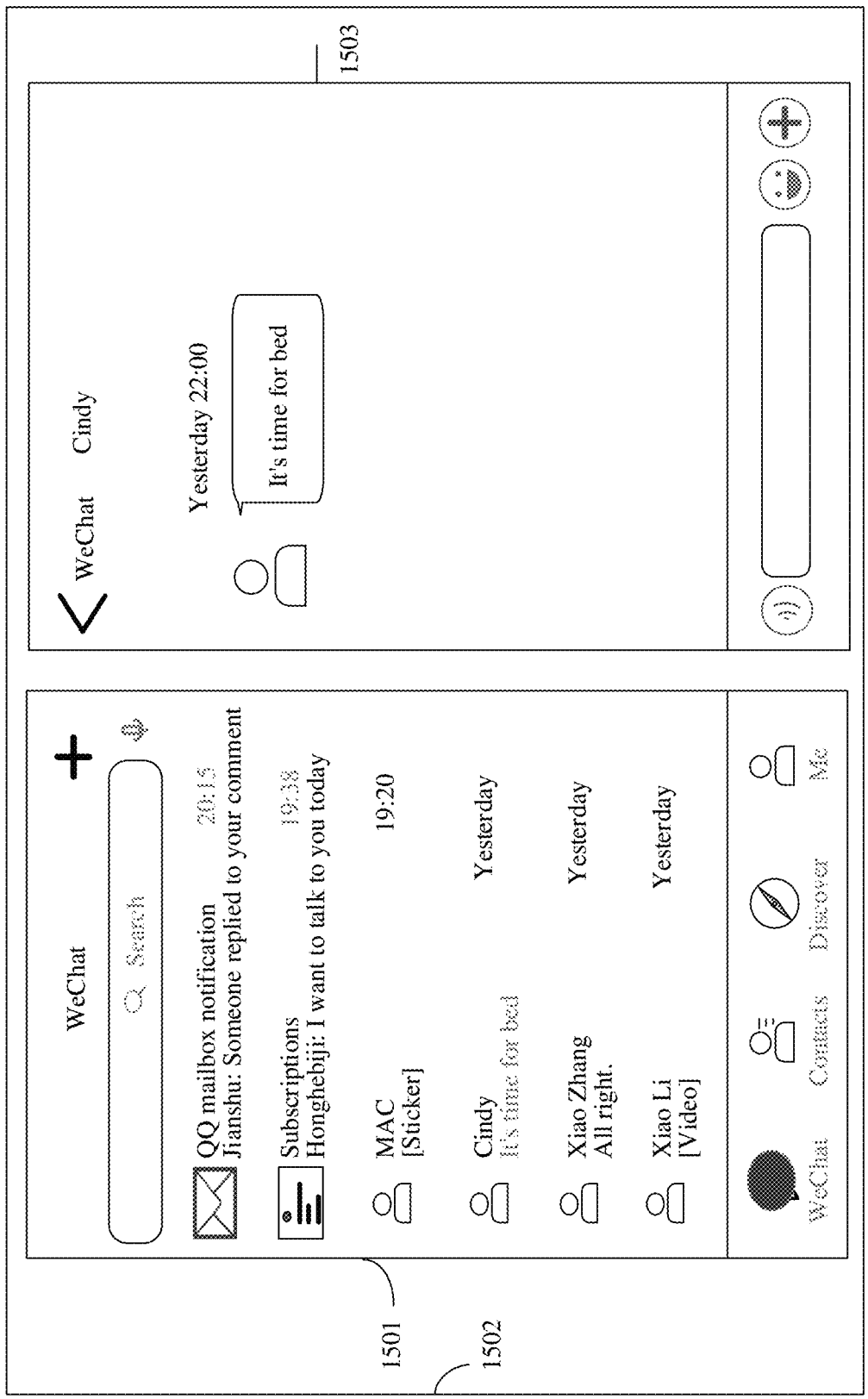

In this application, when a posture of the electronic device is the landscape posture, the electronic device sets a width of the user interface in the landscape posture to be less than a width of the display. The width of the user interface is further less than a width of the display in the portrait posture of the electronic device. In this way, the electronic device may display two user interfaces side by side on the display. The two user interfaces may be an upper-level user interface and a lower-level user interface, for example, a home page user interface of WeChat and a chat user interface of WeChat. For example, FIG. 15A shows a home page user interface of WeChat, namely, the upper-level user interface that is displayed when a posture of the electronic device is the landscape posture. When a user taps a contact (for example, "Cindy"), the electronic device refreshes display content on the display in response to a touch operation of the user. Display content that is obtained after refreshing on the display is shown in FIG. 15B. The display shown in FIG. 15B displays both a home user interface 1501 of WeChat and a chat user interface 1503 with the contact "Cindy". In this way, the user can view the upper-level user interface (for example, the home page user interface of WeChat) and the lower-level user interface (for example, the chat user interface of WeChat) of the application on the display. The user can view the upper-level user interface without touching the lower-level user interface to return to the upper-level user interface, to improve convenience of use.

In this embodiment of this application, the display of the electronic device may be a touchscreen. The following describes a process in which the electronic device identifies a touch operation of a user by using the touchscreen.

The electronic device generates an input event based on coordinates of a touch point touched by the user on the display. Specifically, when the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. The electronic device searches, based on coordinates of the input event, the user interface that is not rendered for an interface element corresponding to the coordinates.

In embodiments of this application, when a posture of the electronic device is a landscape posture, a single-screen posture of a foldable screen, or the like, a width of a user interface obtained by the electronic device is a first width and a height obtained by the electronic device is a first height. The electronic device enlarges the first width and the first height of the user interface to a second width and a second height, then performs layout, and reduces the second width and the second height of the user interface to the first width and the first height for rendering. Because sizes of a user interface that is not rendered and a user interface that is rendered are different, coordinates of interface elements in the user interfaces are different. To ensure accuracy of coordinates corresponding to an interface element displayed on the display, the user interface layout method provided in the embodiments of this application includes the following input event mapping steps.

Figure 16:
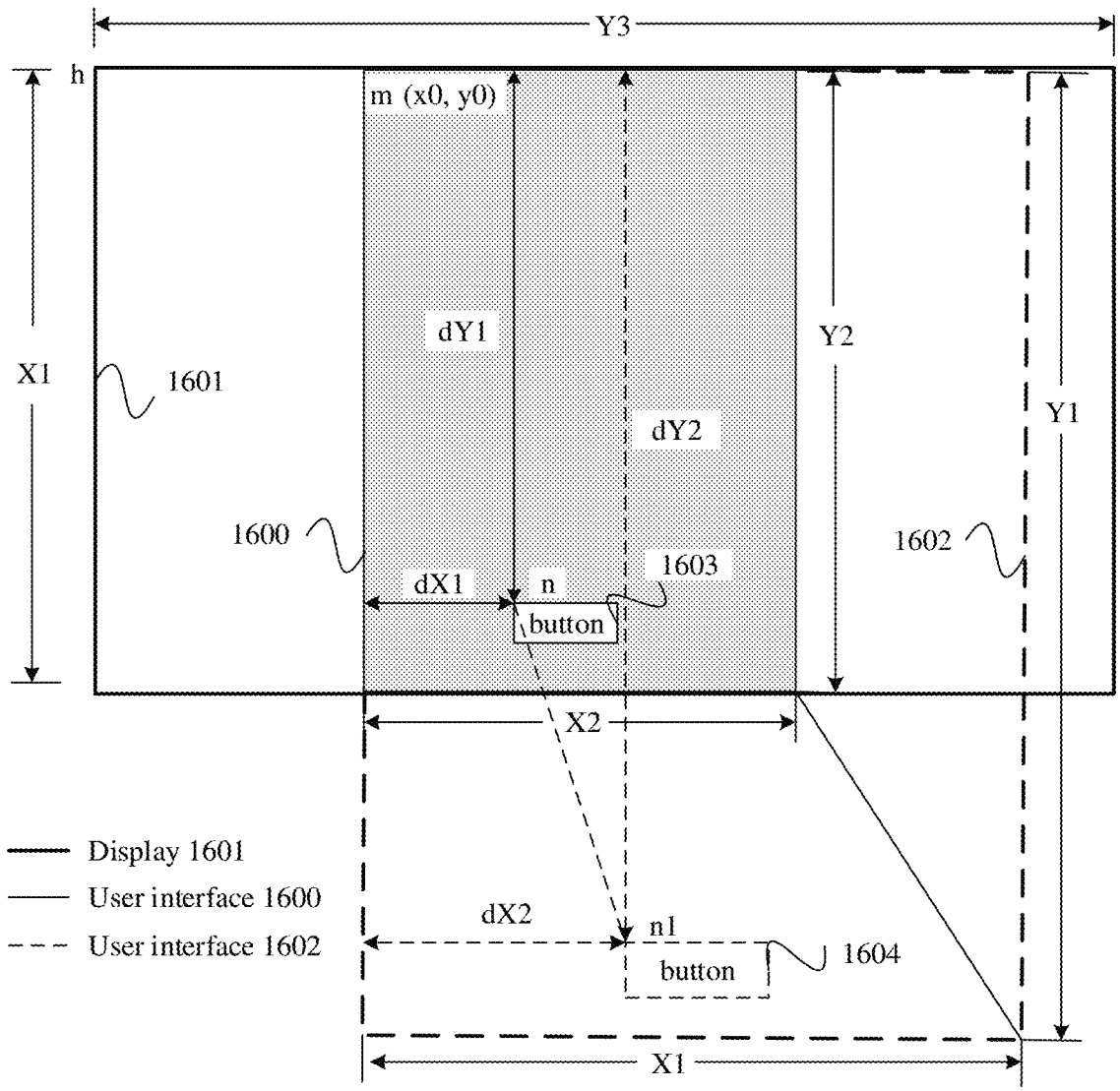
FIG. 16 is a schematic diagram of coordinates mapping of an input event during landscape display of an electronic device according to an embodiment of this application.

FIG. 16 is a schematic diagram of a user interface of the electronic device. As shown in FIG. 16, the user may touch an interface element button 1603 in a user interface 1600. The user interface 1600 is a to-be-rendered user interface, and a user interface 1602 is a user interface in which drawing is completed. Exact coordinates of the user interface element button 1603 should be coordinates corresponding to a user interface button 1604. To resolve the foregoing problem, the user interface layout method provided in this application further includes the mapping steps of the input event.

Figure 17:
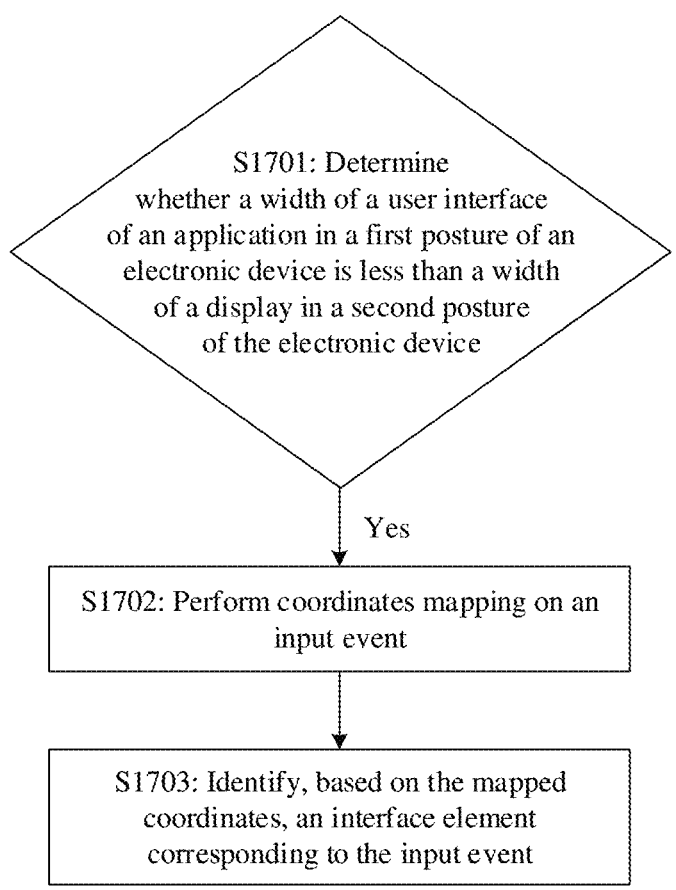
FIG. 17 is a schematic flowchart of coordinates mapping steps of an input event according to an embodiment of this application.

Mapping steps of an input event shown in FIG. 17 are specifically as follows:

S1701: Determine whether a width of a user interface of an application in a first posture of an electronic device is less than a width of a display in a second posture of the electronic device, and if yes, perform steps S1702 and S1703.

First, for how the electronic device determines a posture of the electronic device, refer to the description of the process in which the electronic device determines a posture of the electronic device in step S702. The electronic device obtains a width and a height of the display in the first posture of the electronic device. The electronic device determines a width and a height of the user interface based on the height and the width of the display. The electronic device further obtains the width of the display in the second posture of the electronic device. Finally, the electronic device determines whether the width of the user interface of the application in the first posture of the electronic device is less than the width of the display in the second posture of the electronic device, and if yes, performs steps S1702 and S1703. Herein, the posture of the electronic device may be the first posture or the second posture. The first posture may be a landscape posture, a single-screen posture, or the like. In an implementation, the first posture is the landscape posture, and the second posture is a portrait posture. In another implementation, the first posture is the single-screen posture, and the second posture is a large-screen posture.

When the user interface displayed on the display of the electronic device is a user interface laid out and rendered according to steps S803 to S805, or a user interface laid out and rendered according to steps S1002 to S1004, steps S1702 and S1703 are performed.

S1702: The electronic device performs coordinates mapping on the input event.

The following describes coordinates mapping in this embodiment of this application by using an example in which an interface element is a button. It may be understood that other types of interface elements such as a link and a text box are similar to the button.

FIG. 16 is a schematic diagram of a user interface in the landscape posture of the electronic device. The user interface 1600 is a user interface displayed on a display 1601. When the posture of the electronic device is the landscape posture, a width of the display 1601 is X2, and a height of the display 1601 is Y2. When the posture of the electronic device is the portrait posture, a width of the display 1601 is X1, and a height of the display 1601 is Y3. The user interface 1602 is a user interface obtained after the user interface 1600 is enlarged. A width of the user interface 1602 is X1, and a height of the user interface 1602 is Y1. The user touches the button 1603 in the user interface 1600. The electronic device generates an input event based on coordinates of the electrical contact at the button 1603. An actual position corresponding to the button 1603 is a position of the button 1604 in the user interface 1602.

It is assumed that coordinates of a point m in the user interface 1600 are (x0, y0), and relative coordinates of a point n in the button 1603 relative to the point m in the user interface 1600 are (dx1, dy1). Relative coordinates of the point n in the button 1603 relative to a point h on the display 1601 are (x, y). In this way, x=x0+dx1, and y=y0+dy1. The electronic device may establish a mapping relationship between coordinates of the point n in the button 1603 and coordinates of a point n1 in the button 1604. Coordinates of the button 1604 relative to the upper left corner of the display 1601 are (x0+dx2, y0+dy2). Assuming that an enlargement ratio between the user interface 1600 and the user interface 1602 is known as S, and dx2/dx1=S, coordinates to which the point n in the button 1603 is mapped, that is, coordinates of the point n1 in the button 1604, are (x0+(x−x0)×S, x0+(y−y0)×S).

S1703: The electronic device identifies, based on the mapped coordinates, an interface element corresponding to the input event.

After obtaining the mapped coordinates of the input event, the electronic device identifies a button corresponding to the coordinates. The electronic device then responds based on the button. Specifically, the user touches the interface element button 1603 in the user interface. The electronic device responds, based on the mapping relationship of the coordinates of the input event, to the touch operation of the user by using an interface element corresponding to the coordinates of the button 1604.

The foregoing mapping process of the input event may implement a correspondence between a touch point of a displayed interface element and coordinates to which the displayed interface element should actually correspond. Therefore, after the layout method in FIG. 7, FIG. 8A and FIG. 8B, or FIG. 10A and FIG. 10B is performed on the user interface displayed on the touchscreen, accuracy of responding to a user operation on a displayed interface element can be improved.

With reference to the input event mapping steps included in the user interface layout method proposed in this application, the following describes, by example, working procedures of software and hardware of the electronic device 100.

Figure 18:
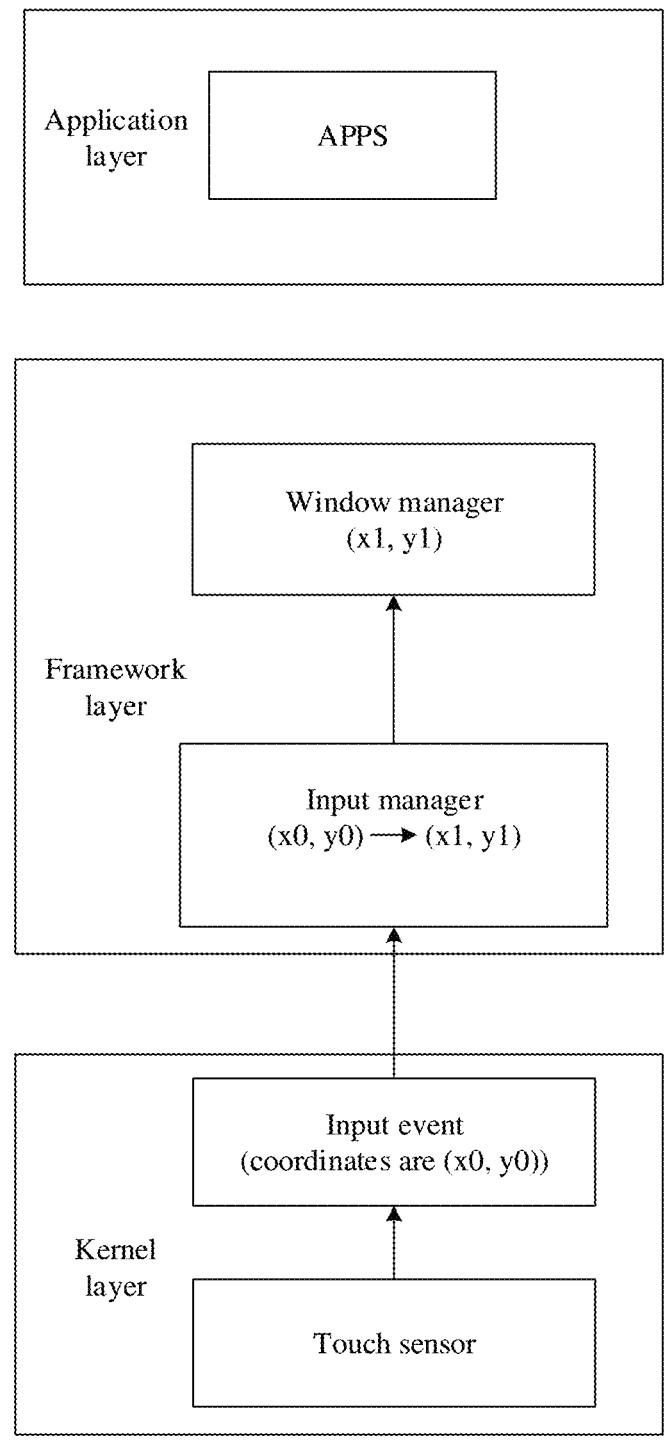
FIG. 18 is a schematic diagram of implementing coordinates mapping steps of an input event in this application by software and hardware of an electronic device according to an embodiment of this application.

As shown in FIG. 18, a kernel layer, a framework layer, and an application layer in FIG. 18 respectively correspond to the kernel layer, the application framework layer, and the application layer in FIG. 2.

The kernel layer of the electronic device processes a touch operation of a user into an input event (including information such as touch coordinates or a timestamp of the touch operation). The input event is stored at a driver layer. The driver layer sends touch coordinates (x0, y0) of the input event to an input management module.

The input manager maps the touch coordinates (x0, y0) of the input event to obtain mapped coordinates (x1, y1), and sends the mapped coordinates (x1, y1) to a window management module.

After obtaining the mapped touch coordinates (x1, y1) of the input event, the window manager at the frame layer identifies a control corresponding to the input event.

According to the user interface layout method provided in this application, the electronic device can determine whether the width of the user interface of the application in the first posture of the electronic device is less than the width of the display in the second posture of the electronic device, and if yes, perform coordinates mapping on the input event. The electronic device identifies, based on the mapped coordinates, the control corresponding to the input event. In this way, the electronic device can complete coordinates mapping of the input event when the application does not sense the input event, so that the electronic device can correctly respond to an operation of the user.

The foregoing descriptions about implementations allow a person skilled in the art to clearly understand that, for the purpose of convenient and brief description, division into only the foregoing function modules is used as an example for illustration. In actual application, the foregoing functions can be allocated to different function modules for implementation based on a requirement. That is, an inner structure of an apparatus is divided into different function modules to implement all or some of the functions described above. For a detailed working process of the foregoing system, apparatus, and unit, refer to a corresponding process in the foregoing method embodiments.

Function units in the embodiments of this application may be integrated into one processing unit, or each of the units may exist alone physically, or two or more units are integrated into one unit. The integrated unit may be implemented in the form of hardware, or may be implemented in the form of a software function unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A user interface layout arrangement method for an electronic device, wherein the electronic device comprises a display, and the method comprises:
   receiving a first instruction instructing to start a first application;
   detecting a posture of the electronic device, wherein postures of the electronic device comprise a landscape posture and a portrait posture, wherein, when the electronic device is in the landscape posture, a width of the display is a third width, a height of the display is a third height;
   based upon determination that the posture of the electronic device is the landscape posture, displaying, by the electronic device, a first user interface of the first application; and
   based upon determination that the posture of the electronic device is the portrait posture, displaying, by the electronic device, a second user interface of the first application;
   wherein before displaying of the first user interface of the first application, the method further comprises:
   determining, by the electronic device, a first width and a first height of the first user interface based on the width and the height of the display when the electronic device is in the landscape posture, wherein the first width is less than the third width, and the first height is equal to the third height;
   determining, by the electronic device, a second width of an intermediary user interface based on the height of the display when the electronic device is in the landscape posture, wherein the intermediary user interface is for generating the first user interface, and the second width is equal to the third height; and
   determining, by the electronic device, a second height of the intermediary user interface based on the first width, the first height, and the second width, wherein a ratio of the second height to the first height is equal to a ratio of the second width to the first width,
   wherein the displaying of the first user interface of the first application comprises:
   drawing, by the electronic device in the intermediary user interface, one or more interface elements of the first user interface, wherein the one or more interface elements are laid out in the intermediary user interface based on the second width and the second height;
   reducing, by the electronic device, the second width and the second height of the intermediary user interface, in which the drawing of the one or more interface elements is completed, to the first width and the first height to obtain the first user interface; and
   rendering the first user interface to the display.

2. The user interface layout arrangement method according to claim 1, further comprising, after the displaying, by the electronic device, a first user interface of the first application:
   receiving, by the electronic device, a touch operation performed by a user on the first user interface, wherein the touch operation corresponds to a first coordinate point in the first user interface;
   obtaining, by the electronic device, coordinates of a second coordinate point in the intermediary user interface, wherein the second coordinate point is in a mapping relationship with the first coordinate point in the first user interface; and
   performing a predetermined operation, by the electronic device, in response to the touch operation performed on the first user interface, wherein the predetermined operation corresponds to an interface element corresponding to the second coordinate point in the intermediary user interface.

3. The user interface layout arrangement method according to claim 1, the displaying, by the electronic device, a second user interface of the first application comprises:
   drawing, by the electronic device, one or more interface elements of the second user interface, wherein the one or more interface elements of the second user interface are laid out based on a width of the second user interface that is the third height and a height of the second user interface that is the third width; and
   rendering, by the electronic device, the second user interface in which the drawing of the one or more interface elements is completed to the display.

4. The user interface layout arrangement method according to claim 1, further comprising, after the displaying, by the electronic device, a first user interface of the first application,
   upon detection that the posture of the electronic device is switched from the landscape posture to the portrait posture, switching a user interface displayed by the electronic device from the first user interface to the second user interface.

5. The user interface layout arrangement method according to claim 1, further comprising, after the displaying, by the electronic device, a second user interface of the first application:
   upon detection that the posture of the electronic device is switched from the portrait posture to the landscape posture, switching a user interface displayed by the electronic device from the second user interface to the first user interface.

6. A user interface layout arrangement method for an electronic device, wherein the electronic device comprises a display, and the method comprises:
   receiving, by the electronic device, a first instruction instructing to start a first application;
   detecting, by the electronic device, a posture of the electronic device, wherein postures of the electronic device comprise a single-screen posture and a large-screen posture;

based upon determination that the posture of the electronic device is the single-screen posture, displaying, by the electronic device, a first user interface of the first application, wherein, when the electronic device is in the single-screen posture, a width of the display is a first width, a height of the display is a first height, a width of the first user interface is equal to the first width, and a height of the first user interface is equal to the first height; and based upon determination that the posture of the electronic device is the large-screen posture, displaying, by the electronic device, a second user interface of the first application, wherein, when the electronic device is in the large-screen posture, a width of the display is a second width, the second width is greater than the first width, and a height of the display is the first height;

wherein before the displaying of the first user interface of the first application, the method further comprises:

determining, by the electronic device, the first width and the first height of the first user interface based on the width and the height of the display when the electronic device is in the large-screen posture;

determining, by the electronic device, a second width of an intermediary user interface based on the height of the display when the electronic device is in the large-screen posture, wherein the intermediary user interface is for generating the first user interface;

determining, by the electronic device, a second height of the intermediary user interface based on the first width, the first height, and the second width, wherein a ratio of the second height to the first height is equal to a ratio of the second width to the first width, wherein the displaying of the first user interface of the first application comprises:

drawing, by the electronic device in the intermediary user interface, one or more interface elements of the first user interface, wherein the one or more interface elements are laid out in the intermediary user interface based on the second width and the second height;

reducing, by the electronic device, the second width and the second height of the intermediary user interface, in which the drawing of the one or more interface elements is completed, to the first width and the first height to obtain the first user interface; and rendering the first user interface to the display.

7. The user interface layout arrangement method according to claim 6, further comprising, after the displaying, by the electronic device, a first user interface of the first application:

receiving, by the electronic device, a touch operation performed by a user on the first user interface, wherein the touch operation corresponds to a first coordinate point in the first user interface;

obtaining, by the electronic device, coordinates of a second coordinate point in the intermediary user interface, wherein the second coordinate point is in a mapping relationship with the first coordinate point in the first user interface; and performing a predetermined operation, by the electronic device, in response to the touch operation performed on the first user interface, wherein the predetermined operation corresponds to an interface element corresponding to the second coordinate point in the intermediary user interface.

8. The user interface layout arrangement method according to claim 1, wherein the first width is 1/f of the third width, wherein f is a real number greater than 1.

9. The user interface layout arrangement method according to claim 1, wherein the second height of the intermediary user interface is obtained by enlarging the first height based on the ratio of the second width to the first width.

10. The user interface layout arrangement method according to claim 6, the displaying, by the electronic device, a second user interface of the first application comprises:

drawing, by the electronic device, one or more interface elements of the second user interface, wherein the one or more interface elements of the second user interface are laid out based on a width of the second user interface that is the second width and a height of the second user interface that is the first height; and rendering, by the electronic device, the second user interface in which the drawing of the one or more interface elements is completed to the display.

11. The user interface layout arrangement method according to claim 6, further comprising, after the displaying, by the electronic device, a first user interface of the first application:

upon detection that the posture of the electronic device is switched from the single-screen posture to the large-screen posture, switching a user interface displayed by the electronic device from the first user interface to the second user interface.

12. The user interface layout arrangement method according to claim 6, further comprising, after the displaying, by the electronic device, a second user interface of the first application:

upon detection that the posture of the electronic device is switched from the large-screen posture to the single-screen posture, switching a user interface displayed by the electronic device from the second user interface to the first user interface.

13. An electronic device, comprising a display, a communications interface, a memory, and one or more processors, the communications interface and the memory are coupled to the one or more processors, the memory is configured to store computer program code comprising computer instructions that, when executed by the one or more processors, cause the electronic device to perform operations comprising:

receiving a first instruction instructing to start a first application;

detecting a posture of the electronic device, wherein postures of the electronic device comprise a landscape posture and a portrait posture, wherein, when the electronic device is in the landscape posture, a width of the display is a third width, a height of the display is a third height;

based upon determination that the posture of the electronic device is the landscape posture, displaying a first user interface of the first application; and based upon determination that the posture of the electronic device is the portrait posture, displaying a second user interface of the first application;

wherein before displaying the first user interface of the first application, the operations further comprise:

determining a first width and a first height of the first user interface based on the width and the height of the display when the electronic device is in the landscape posture, wherein the first width is less than the third width, and the first height is equal to the third height;

determining a second width of an intermediary user interface based on the height of the display when the electronic device is in the landscape posture, wherein the intermediary user interface is for generating the first user interface, and the second width is equal to the third height; and determining a second height of the intermediary user interface based on the first width, the first height, and the second width, wherein a ratio of the second height to the first height is equal to a ratio of the second width to the first width, wherein the displaying of the first user interface of the first application comprises:

drawing, in the intermediary user interface, one or more interface elements of the first user interface, wherein the one or more interface elements are laid out in the intermediary user interface based on the second width and second height;

reducing the second width and the second height of the intermediary user interface in which the drawing of the one or more interface elements is completed, to the first width and the first height to obtain the first user interface; and rendering the first user interface to the display.

14. The electronic device according to claim 13, the operations further comprise, after displaying the first user interface of the first application:

receiving a touch operation performed by a user on the first user interface, wherein the touch operation corresponds to a first coordinate point in the first user interface;

obtaining coordinates of a second coordinate point in the intermediary user interface, wherein the second coordinate point is in a mapping relationship with the first coordinate point in the first user interface; and performing a predetermined operation in response to the touch operation performed on the first user interface, wherein the predetermined operation corresponds to an interface element corresponding to the second coordinate point in the intermediary user interface.

15. The electronic device according to claim 13, wherein the operations further comprise:

drawing one or more interface elements of the second user interface, wherein the one or more interface elements of the second user interface are laid out based on a width of the second user interface that is the third height and a height of the second user interface that is the third width; and rendering the second user interface in which the drawing of the one or more interface elements is completed to the display.

16. The electronic device according to claim 13, the operations comprise, after displaying the first user interface of the first application:

upon detection that the posture of the electronic device is switched from the landscape posture to the portrait posture, switching a user interface displayed by the electronic device from the first user interface to the second user interface.

17. The electronic device according to claim 13, the operations comprise, after displaying the second user interface of the first application:

upon detection that the posture of the electronic device is switched from the portrait posture to the landscape posture, switching a user interface displayed by the electronic device from the second user interface to the first user interface.

18. An electronic device, comprising a display, a communications interface, a memory, and at least one processor, the communications interface and the memory are coupled to the at least one processor, the memory is configured to store computer program code comprising computer instructions that, when executed by the at least one processor, cause the electronic device to perform operations comprising:

receiving a first instruction instructing to start a first application;

detecting a posture of the electronic device, wherein postures of the electronic device comprise a single-screen posture and a large-screen posture;

based upon determination that the posture of the electronic device is the single-screen posture, displaying a first user interface of the first application, wherein, when the electronic device is in the single-screen posture, a width of the display is a first width, a height of the display is a first height, a width of the first user interface is equal to the first width, and a height of the first user interface is equal to the first height; and based upon determination that the posture of the electronic device is the large-screen posture, displaying a second user interface of the first application, wherein, when the electronic device is in the large-screen posture, a width of the display is a second width, the second width is greater than the first width, and a height of the display is the first height;

wherein before the displaying of the first user interface of the first application, the operations further comprise:

determining the first width and the first height of the first user interface based on the width and the height of the display when the electronic device is in the large-screen posture;

determining a second width of an intermediary user interface based on the height of the display when the electronic device is in the large-screen posture, wherein the intermediary user interface is for generating the first user interface; and determining a second height of the intermediary user interface based on the first width, the first height, and the second width, wherein a ratio of the second height to the first height is equal to a ratio of the second width to the first width, wherein the displaying of the first user interface of the first application comprises:

drawing, in the intermediary user interface, one or more interface elements of the first user interface, wherein the one or more interface elements are laid out in the intermediary user interface based on the second width and the second height;

reducing the second width and the second height of the intermediary user interface, in which the drawing of the one or more interface elements is completed, to the first width and the first height to obtain the first user interface; and rendering the first user interface to the display.

19. The electronic device according to claim 18, where the operations further comprise:

after displaying the first user interface of the first application:

receiving a touch operation performed by a user on the first user interface, wherein the touch operation corresponds to a first coordinate point in the first user interface;

obtaining coordinates of a second coordinate point in the intermediary user interface, wherein the second coordinate point is in a mapping relationship with the first coordinate point in the first user interface; and performing a predetermined operation in response to the touch operation performed on the first user interface, wherein the predetermined operation corresponds to an interface element corresponding to the second coordinate point in the intermediary user interface.

\* \* \* \* \*